US012659336B2

(12) United States Patent
Zaifman et al.

(10) Patent No.: US 12,659,336 B2
(45) Date of Patent: *Jun. 16, 2026

(54) WEB PAGE SPECTROSCOPY

(71) Applicant: AT&T Intellectual Property I, L.P., Atlanta, GA (US)

(72) Inventors: Arthur L. Zaifman, Millburn, NJ (US); John Mark Mocenigo, Califon, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/943,639

(22) Filed: Nov. 11, 2024

(65) Prior Publication Data

US 2025/0071131 A1 Feb. 27, 2025

Related U.S. Application Data

(63) Continuation of application No. 18/159,118, filed on Jan. 25, 2023, now Pat. No. 12,143,409, which is a
(Continued)

(51) Int. Cl.
*H04L 9/40* (2022.01)
*G06F 16/955* (2019.01)
(Continued)

(52) U.S. Cl.
CPC ........ *H04L 63/1425* (2013.01); *G06F 16/955* (2019.01); *G06N 7/01* (2023.01);
(Continued)

(58) Field of Classification Search
CPC . H04L 63/1425; H04L 67/535; H04L 67/125; G06F 16/955; G06N 20/00; G06N 7/01
See application file for complete search history.

(56) References Cited

U.S. PATENT DOCUMENTS 7,828,679 B2 11/2010 Tell et al.
7,961,917 B2 6/2011 Black
(Continued)

OTHER PUBLICATIONS

Heath, "How AT&T Recognizes Unauthorized Tethering from Jailbroken iPhones," May 8, 2011, 3 pages_ http:www.idownloadblog.com/2011/05/08/how-atl-recognizes-unaulhorized-tethering-from-jailbroken-iphones/.
(Continued)

*Primary Examiner* — Ninos Donabed

(57) ABSTRACT

Facilitating web page spectroscopy in a communications network is provided herein. A system can comprise a processor and a memory that stores executable instructions that, when executed by the processor, facilitate performance of operations. The operations can comprise receiving first data that describes a first communication packet flow and second data that describes a second communication packet flow. The operations can also comprise training a model based on the first data and the second data, as a result of which the model is trained to detect respective behaviors represented by the first data and the second. Further, the operations can comprise extracting a common parameter from third data that describes a third communication packet flow and fourth data that describes a fourth communication packet flow based on the model.

20 Claims, 22 Drawing Sheets

Related U.S. Application Data continuation of application No. 17/061,037, filed on Oct. 1, 2020, now Pat. No. 11,582,254, which is a continuation of application No. 15/960,713, filed on Apr. 24, 2018, now Pat. No. 10,834,112.

(51) Int. Cl.

| | |
|---|---|
| *G06N 7/01* | (2023.01) |
| *G06N 20/00* | (2019.01) |
| *H04L 67/125* | (2022.01) |
| *H04L 67/50* | (2022.01) |

(52) U.S. Cl.
CPC ........... *G06N 20/00* (2019.01); *H04L 67/125* (2013.01); *H04L 67/535* (2022.05)

(56) References Cited

U.S. PATENT DOCUMENTS

| | | | |
|---|---|---|---|
| 8,142,318 | B2 | 3/2012 | Palmer |
| 8,985,061 | B2 | 3/2015 | Royals |
| 9,178,241 | B2 | 11/2015 | Davidson et al. |
| 9,213,990 | B2 | 12/2015 | Adjaoute |
| 9,237,028 | B1 * | 1/2016 | Rai ........................ H04W 12/08 |
| 9,369,476 | B2 | 6/2016 | Chekina et al. |
| 9,672,355 | B2 | 6/2017 | Titonis et al. |
| 9,710,752 | B2 | 7/2017 | Salajegheh et al. |
| 9,747,603 | B2 | 8/2017 | Foote et al. |
| 9,762,611 | B2 | 9/2017 | Wallace et al. |
| 9,769,668 | B1 | 9/2017 | Cui et al. |
| 9,774,614 | B2 | 9/2017 | Patne et al. |
| 9,787,695 | B2 | 10/2017 | Gantman et al. |
| 10,140,824 | B2 * | 11/2018 | Schultz .................. G08B 13/12 |
| 10,237,183 | B2 * | 3/2019 | Srivastav ................ H04W 4/80 |
| 10,387,795 | B1 | 8/2019 | Oldridge et al. |
| 10,694,503 | B2 | 6/2020 | Kiukkonen et al. |
| 2006/0215886 | A1 | 9/2006 | Black |
| 2009/0229936 | A1 | 9/2009 | Cuong et al. |
| 2009/0263438 | A1 | 10/2009 | Melander et al. |
| 2010/0253476 | A1 | 10/2010 | Poutiatine et al. |
| 2010/0302233 | A1 | 12/2010 | Holland |
| 2011/0189743 | A1 | 8/2011 | Yoshikuni et al. |
| 2012/0026992 | A1 | 2/2012 | Navda et al. |
| 2012/0240197 | A1 | 9/2012 | Tran et al. |
| 2013/0021933 | A1 * | 1/2013 | Kovvali ................ H04W 88/18 370/252 |
| 2013/0153335 | A1 * | 6/2013 | Luminet ................ A42B 3/046 182/112 |
| 2013/0159503 | A1 * | 6/2013 | Erman ................ H04W 12/106 709/224 |

| | | | |
|---|---|---|---|
| 2013/0199251 | A1 * | 8/2013 | Taylor ................. E05B 73/0082 340/568.1 |
| 2014/0052538 | A1 | 2/2014 | Foote et al. |
| 2014/0123289 | A1 | 5/2014 | Hsiao et al. |
| 2014/0269430 | A1 | 9/2014 | Erman et al. |
| 2014/0279793 | A1 | 9/2014 | Wohlstadter |
| 2014/0282137 | A1 | 9/2014 | Lin et al. |
| 2015/0045992 | A1 | 2/2015 | Ashby et al. |
| 2015/0074197 | A1 | 3/2015 | Brown et al. |
| 2015/0088760 | A1 | 3/2015 | Meurs |
| 2015/0112857 | A1 | 4/2015 | Gellis et al. |
| 2015/0149614 | A1 * | 5/2015 | Sinha ...................... H04W 8/18 709/224 |
| 2015/0201444 | A1 | 7/2015 | Kiukkonen et al. |
| 2015/0220992 | A1 | 8/2015 | Brown et al. |
| 2015/0242895 | A1 | 8/2015 | Brown et al. |
| 2015/0262052 | A1 | 9/2015 | Pahuja |
| 2015/0315581 | A1 | 11/2015 | Han et al. |
| 2015/0332340 | A1 | 11/2015 | Brown et al. |
| 2016/0165065 | A1 | 6/2016 | Damstra |
| 2016/0227404 | A1 | 8/2016 | Kollu et al. |
| 2017/0020540 | A1 | 1/2017 | Chou et al. |
| 2017/0222960 | A1 * | 8/2017 | Agarwal ................ G06N 20/00 |
| 2017/0227995 | A1 | 8/2017 | Lee et al. |
| 2017/0236320 | A1 | 8/2017 | Gribetz et al. |
| 2017/0366562 | A1 | 12/2017 | Zhang et al. |
| 2018/0018590 | A1 | 1/2018 | Szeto et al. |
| 2018/0090942 | A1 | 3/2018 | Nunez et al. |
| 2018/0097729 | A1 * | 4/2018 | Srivastav ................ H04L 69/16 |
| 2018/0242978 | A1 | 8/2018 | Chou et al. |
| 2018/0292826 | A1 | 10/2018 | DeFelice et al. |
| 2018/0318716 | A1 | 11/2018 | Benedetto |
| 2019/0227528 | A1 | 7/2019 | Abbott et al. |
| 2019/0327254 | A1 | 10/2019 | Zaifman et al. |
| 2020/0005385 | A1 | 1/2020 | Stout et al. |
| 2021/0388941 | A1 * | 12/2021 | Cheung ................... F16B 9/054 |

OTHER PUBLICATIONS

Conti el al., "The Dark Side (—Channel) of Mobile Devices: A Survey on Network Traffic Analysis," Aug. 12, 2017, arXiv:1708. 03766v1 [cs.CR], 41 pages.

Non-Final Office Action received for U.S. Appl. No. 15/960,713 dated Jan. 10, 2020, 66 pages.

Nguyen, "A Survey of Techniques for Internet Traffic Classification using Machine Learning", 2008, IEEE. (Year: 2008).

Notice of Allowance received for U.S. Appl. No. 15/960,713 dated Jul. 8, 2020, 44 pages.

Notice of Allowance received for U.S. Appl. No. 17/061,037 dated Oct. 13, 2022, 58 pages.

* cited by examiner

Notched Box Plot

Second Group 704

First Group 702

706

FIG. 10

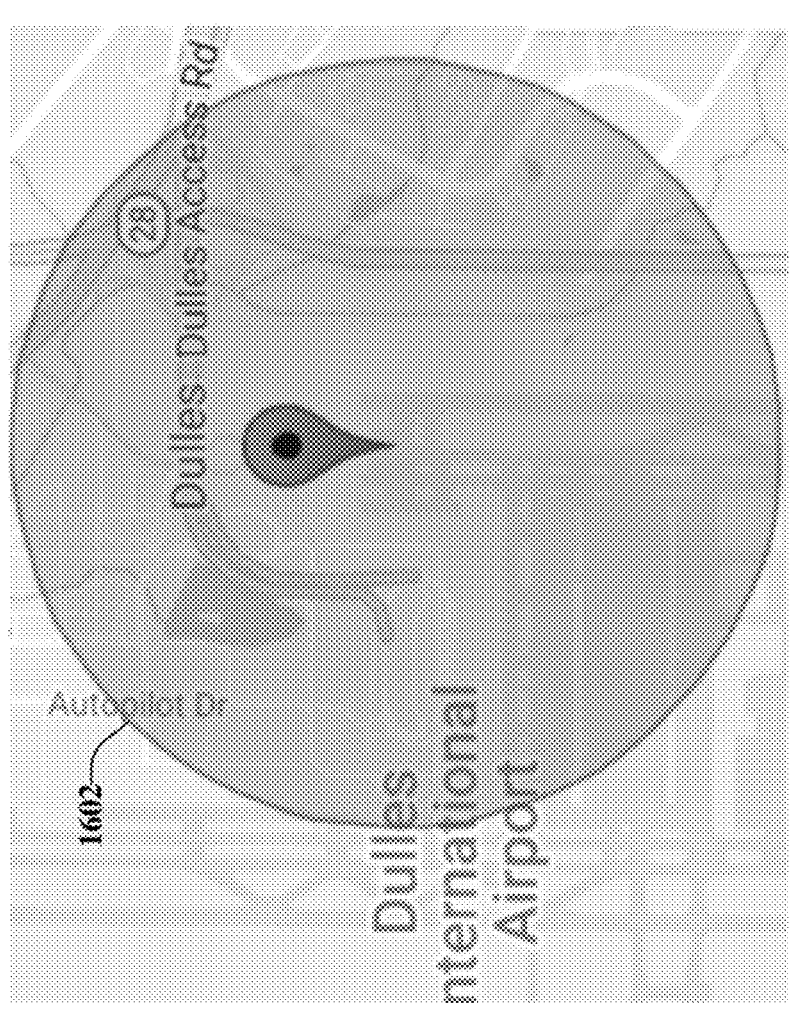
FIG. 16

Number of
Devices 1702

Time 1704

1706

1708

1700

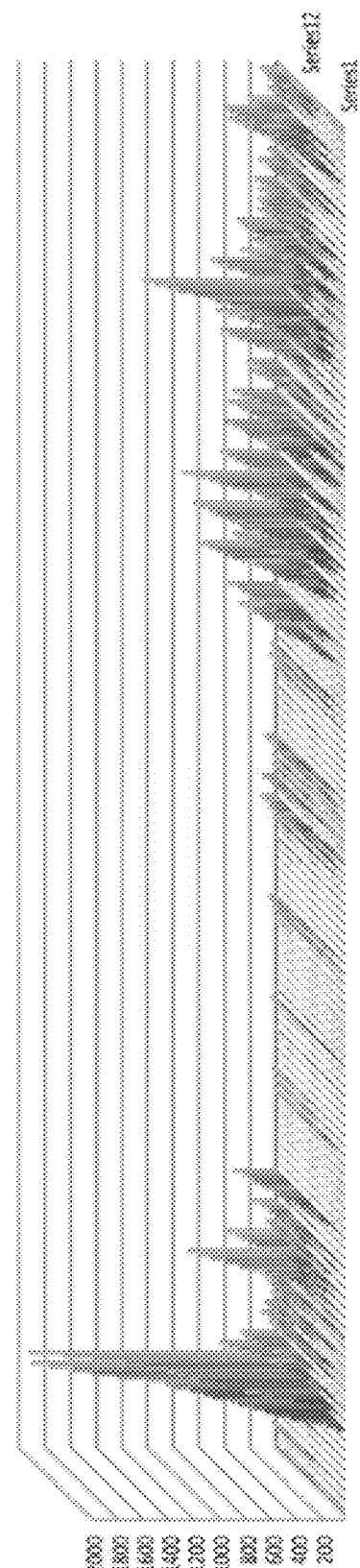
Cell Tower
Identifiers
1804
Number of
Devices 1802
FIG. 18

Figure 19:
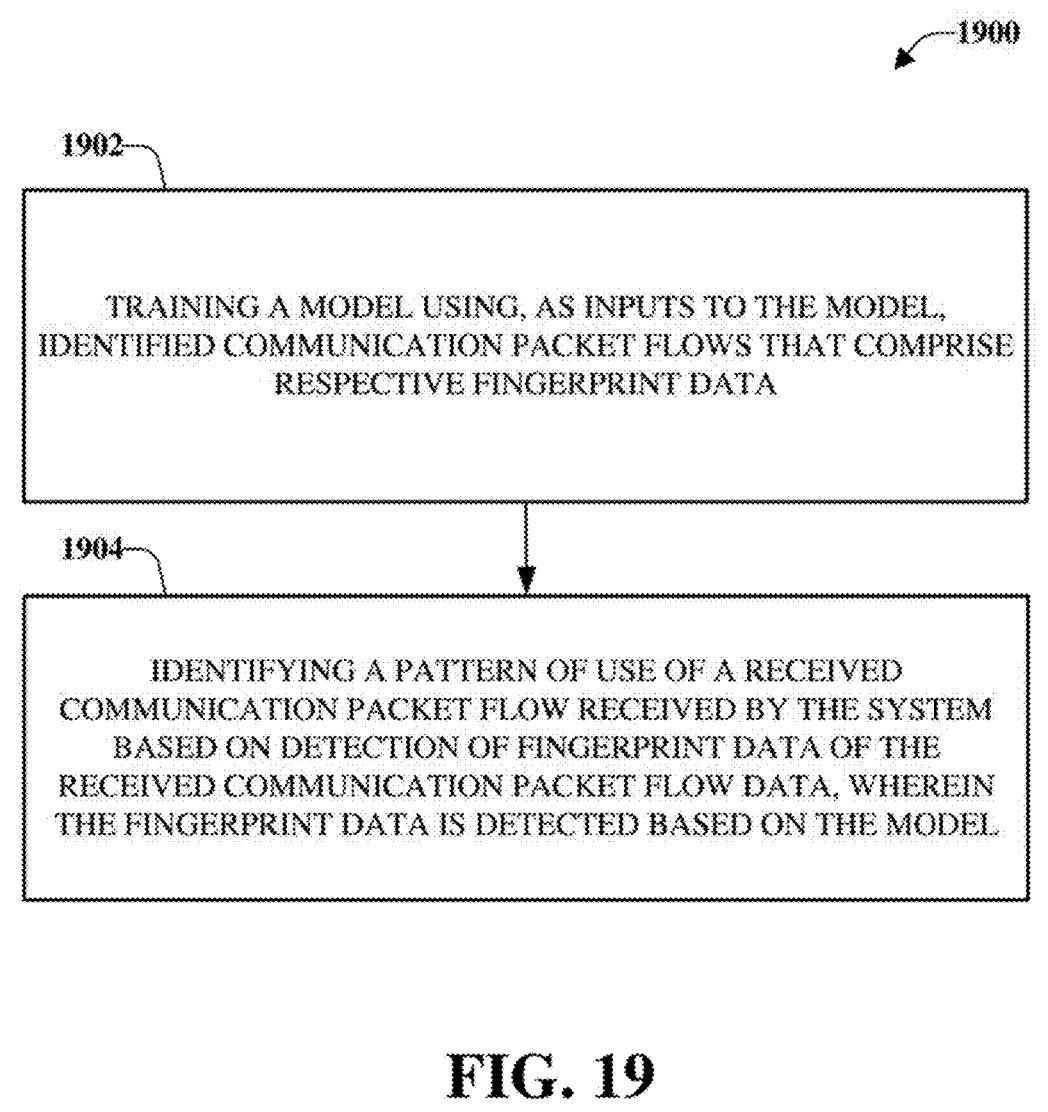

1900

1902

TRAINING A MODEL USING, AS INPUTS TO THE MODEL, IDENTIFIED COMMUNICATION PACKET FLOWS THAT COMPRISE RESPECTIVE FINGERPRINT DATA

1904

IDENTIFYING A PATTERN OF USE OF A RECEIVED COMMUNICATION PACKET FLOW RECEIVED BY THE SYSTEM BASED ON DETECTION OF FINGERPRINT DATA OF THE RECEIVED COMMUNICATION PACKET FLOW DATA, WHEREIN THE FINGERPRINT DATA IS DETECTED BASED ON THE MODEL

RECEIVING COMMUNICATION PACKET FLOWS FROM ONE OR MORE COMMUNICATION DEVICES

2004

TRAINING A MODEL ON IDENTIFIED COMMUNICATION PACKET FLOW

2006

IDENTIFYING A PATTER OF USE OF THE COMMUNICATION PACKET FLOW

2008

IDENTIFYING CONFLICTING UNIFORM RESOURCE LOCATORS IN THE RECEIVED COMMUNICATION PACKET FLOW

2010

DETERMINING UNAUTHORIZED TETHERING

WEB PAGE SPECTROSCOPY

RELATED APPLICATIONS

This application is a continuation of U.S. patent application Ser. No. 18/159,118, filed on Jan. 25, 2023, now U.S. Pat. No. 12,143,409, which is a continuation of U.S. patent application Ser. No. 17/061,037, filed on Oct. 1, 2020, now U.S. Pat. No. 11,582,254, which is a continuation of U.S. patent application Ser. No. 15/960,713, filed on Apr. 24, 2018, now U.S. Pat. No. 10,834,112, all of which are herein incorporated in their entireties.

TECHNICAL FIELD

The subject disclosure relates generally to communications systems, and, for example, to data evaluation and device management in communication networks.

BACKGROUND

In communication networks, various data is available related to communication devices and usage of the communication devices. Therefore, unique opportunities exist for application of the available data while maintaining anonymity of the data in order to address privacy concerns in communication networks.

BRIEF DESCRIPTION OF THE DRAWINGS

Various non-limiting embodiments are further described with reference to the accompanying drawings in which:

FIG. 10 illustrates example, non-limiting plots comparing uplink packet counts between a tethered group and a non-tethered group in accordance with one or more embodiments described herein;

FIG. 16 illustrates an example, non-limiting, geo-fence within a defined geographic area in accordance with one or more embodiments described herein;

FIG. 18 illustrates an example, non-limiting, plot or representation of cumulative airport arrival frequency by cell tower in accordance with one or more embodiments described herein;

FIG. 19 illustrates an example, non-limiting, method for determining behaviors associated with one or more communication packet flows in accordance with one or more embodiments described herein;

DETAILED DESCRIPTION

Figure 1:
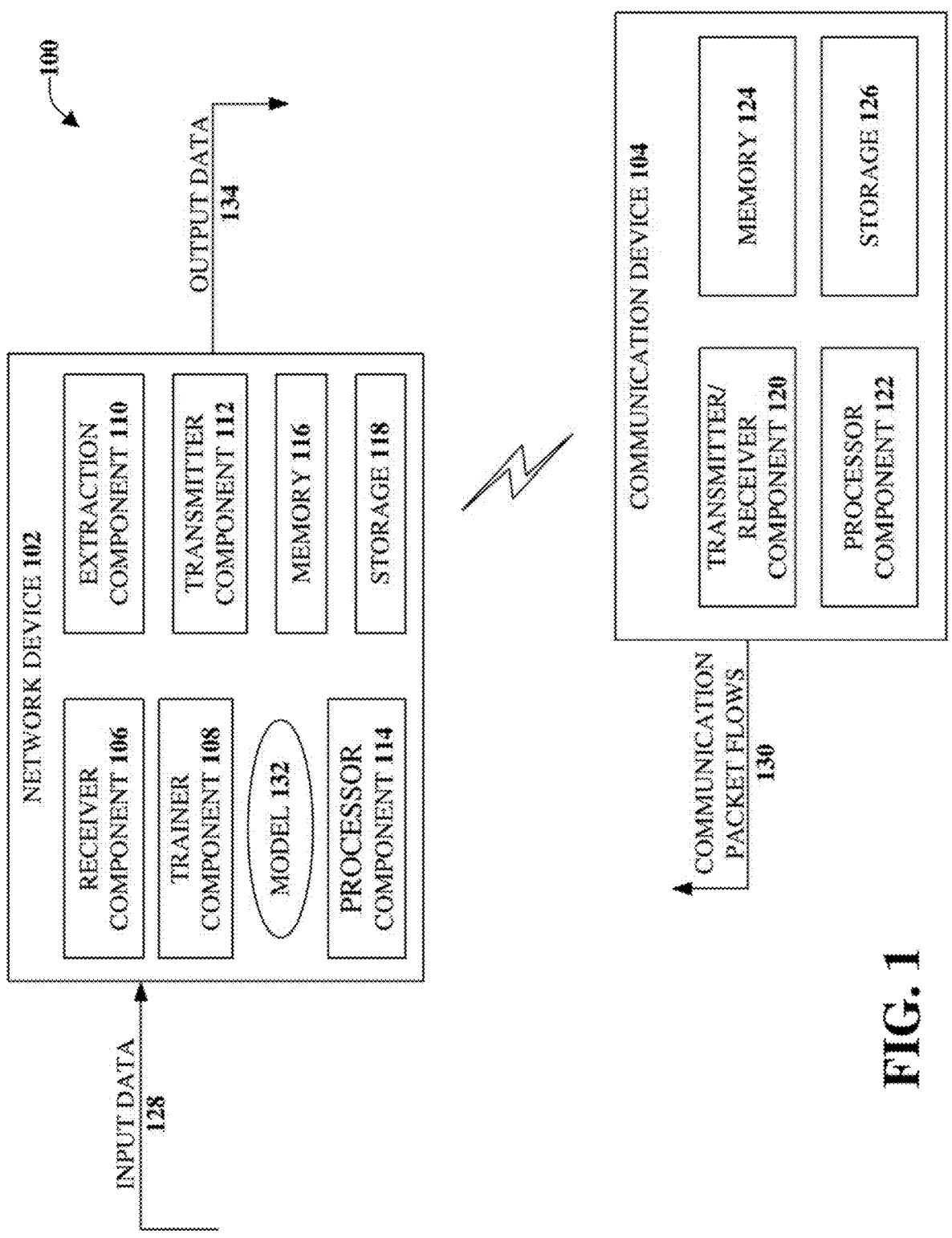
FIG. 1 illustrates an example, non-limiting, communications system for facilitating web page spectroscopy in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular network environment or standard).

Discussed herein are various aspects that relate to web page spectroscopy. In an example, one or more communication network packets can be captured from respective electronic devices and input into a machine learner component that can be trained based on application of one or more machine learning techniques on the one or more communication network packets. Based on the training, various activities associated with the one or more electronic devices (and related users of the one or more electronic devices) can be identified and analyzed. Based on the identification and analysis, according to an implementation, unauthorized tethering/hot-spot from hacking/jail-breaking the mobile device can be determined and action can be taken to disrupt the unauthorized use. In an additional or alternative implementation, the identification and analysis can be utilized to provide useful data to the respective users of the one or more electronic devices. In an example, the useful data can include information relevant to the interests of the user, including targeted advertisements.

In an example, conventional identification of user activity through their respective electronic devices has relied upon Deep Packet Inspection (DPI) or agents installed on the device. DPI has become ineffective because encryption/ SSL/HTTPS is being utilized for security and privacy issues. In addition, agents are expensive and prone to viruses. Therefore, the various aspects provided herein can be utilized to identify various subscribers (e.g., users) activities with their electronic devices without relying on DPI and/or device-local agents. Thus, the various aspects, can apply machine learning techniques in order to identify unauthorized tethering.

Advantages of the disclosed subject matter include the use of web page spectroscopy to determine habits of users of mobile devices (e.g., a subscriber community) without the invasion of privacy associated with DPI methods and/or the costly and virus/attack prone agent technologies. As an example, most web pages possess a relatively stable spectroscopic signature that can be utilized to identify the actual web site or action on the web site. As another advantage, more effective targeted marketing can be achieved when a subscriber's habits are understood.

In one embodiment, described herein is a system that can comprise a processor and a memory that stores executable instructions that, when executed by the processor, facilitate performance of operations. The operations can comprise receiving first data that describes a first communication packet flow and second data that describes a second communication packet flow. The first communication packet flow and the second communication packet flow can be associated with a communication device of a communications network. The operations can also comprise training a model based on the first data and the second data, as a result of which the model is trained to detect respective behaviors represented by the first data and the second data. Further, the operations can comprise extracting a common parameter from third data that describes a third communication packet flow and fourth data that describes a fourth communication packet flow based on the model.

In an example, the common parameter can be associated with web page displays. Further to this example, the operations can comprise identifying overlapping web page displays of the web page displays that are associated with the communication device. The operations can also comprise determining that tethering is occurring at the communication device based on the overlapping web page displays.

Further to the above example, identifying the overlapping web page displays can comprise analyzing respective spectroscopic signatures associated with the web page displays. The respective spectroscopic signatures can indicate respective websites associated with the overlapping web page displays. Additionally, or alternatively, the respective spectroscopic signatures can indicate interactions associated with the overlapping web page displays.

In an example, the operations can also comprise determining an accuracy level of the tethering determined to be occurring at the communication device based on the overlapping web page displays. Further, the operations can comprise inputting the common parameter into the model and retraining the model based on the first data, the second data, the third data, the fourth data, the common parameter, and the accuracy level.

According to another example, receiving the first data and the second data can comprise receiving first domain name system traffic information and second domain name system traffic information. In another example, extracting the common parameter can comprise detecting respective stable spectroscopic signatures of the first data, the second data, the third data, and the fourth data.

In yet another example, receiving the first data and the second data can comprise receiving anonymous traffic of the communications network. Further to this example, training the model can comprise training the model to detect respective behaviors represented by the first data and the second data to at least a defined level of confidence.

According to another example, receiving the first data and the second data can comprise receiving a first header that identifies the first communication network packet flow and a second header that identifies the second communication network packet flow.

Receiving the first data and the second data can comprise receiving first metadata associated with the first communication network packet flow and second metadata associated with the second communication network packet flow.

Training the model can comprise training the model to detect respective fingerprints of third metadata associated with the third communication network packet flow and fourth metadata associated with the fourth communication network packet flow based on known fingerprints of the first metadata and the second metadata.

According to another embodiment, provided herein is a machine-readable storage medium that comprises executable instructions that, when executed by a processor of a network device of a wireless network, facilitate performance of operations. The operations can comprise receiving a group of communication packet flows that comprise respective identified usage parameters. The operations can also comprise, based on the group of communication packet flows, training a model to detect the respective identified usage parameters with a defined level of confidence. Further, the operations can also comprise, based on the model and based on the defined level of confidence, determining a usage parameter of a communication packet flow received by the network device.

In an example, the operations can further comprise detecting scripts executing concurrently in the communication packet flow received by the network device. The scripts can be associated with different web pages and indicate concurrent usage at a communication device of the communication network.

In further detail, FIG. 1 illustrates an example, non-limiting, communications system 100 for facilitating web page spectroscopy in accordance with one or more embodiments described herein.

The communications system 100 can comprise one or more network devices (illustrated as a network device 102) and one or more user equipment or mobile devices (illustrated as a communication device 104). The network device 102 can be included in a group of network devices of a wireless network (e.g., the communications system 100). It is noted that although only a single network device and a single mobile device are illustrated, the communications system 100 can comprise a multitude of network devices and/or a multitude of mobile devices.

The network device 102 can comprise a receiver component 106, a trainer component 108, an extractor component 110, a transmitter component 112, at least one processor component 114, at least one memory 116, and/or at least one storage 118. The communication device 104 can comprise a transmitter/receiver component 120, at least one processor component 122, at least one memory 124, and/or at least one storage 126.

The receiver component 106 can receive input data 128 that describes communication packet flows 130 transmitted, as output data, from the communication device 104 (e.g., via the transmitter/receiver component 120). The communication packet flows 130 can be communications from the communication device 104 to the network device 102, to other network devices, and/or to other mobile devices in the communications system 100.

The trainer component 108 can train a model 132 on the input data 128. The model 132 (e.g., a detection model, a classification model, or another type of model) can be a model into which data can be fed. The model can be trained on data that comprises known content. For example, the model can be fed strictly data from known communication packet flows such that the model is trained to detect the behaviors consistently. Upon or after the model is trained to accurately predict the behaviors, the model can learn to detect the same behaviors or unknown behaviors with a high level of confidence. The trainer component 108 can train the model 132 to detect behavior of the data to a defined level of confidence.

Based on the defined level of confidence, the extractor component 110 can extract, from newly received data that describes communication packet flows newly transmitted by the communication device 104, a common parameter associated with the newly received data. The common parameter can be output, by the transmitter component 112 as output data 134.

According to an example, the receiver component 106 can receive first data (e.g., input data 128) that describes a first communication packet flow (e.g., included in the communication packet flows 130) and second data (e.g., input data 128) that describes a second communication packet flow (e.g., included in the communication packet flows 130). Using the first data and the second data, the trainer component 108 can train the model 132 to detect respective behaviors of the first data and the second data. For example, the first data and the second data can comprise known content (e.g., known behaviors) and the model 132 can be trained to detect the known content or known behaviors. Upon or after the model 132 has been trained on the first data and the second data, to a defined level of confidence, subsequent data from subsequent communication packet flows can be input into the model 132 to determine one or more behaviors associated with the subsequent data.

The receiver component 106 can receive input data 128 that comprises first data that describes a first communication packet flow and second data that describes a second communication packet flow. In an example, the first data can comprise first domain name system traffic information and the second data can comprise second domain name system traffic information. Further, the third data can comprise third domain name system traffic information and the fourth data can comprise fourth domain name system traffic information. In another example, the first data, the second data, the third data, and the fourth data can comprise anonymous communication network traffic.

In another example, the first data can comprise a first header that identifies the first communication network packet flow and the second data can comprise a second header that identifies the second communication network packet flow. Further to this example, the third data can comprise a third header that identifies the third communication network packet flow and the fourth data can comprise a fourth header that identifies the fourth communication network packet flow.

According to another example, the first data can comprise first metadata associated with the first communication packet flow and the second data can comprise second metadata associated with the second communication network packet flow. Further to this example, the third data can comprise third metadata associated with the third communication network packet flow and the fourth data can comprise fourth metadata associated with the fourth communication network packet flow.

According to some implementations, to determine the common parameter, the extractor component 110 can detect respective stable spectroscopic signatures of the first data, the second data, the third data, and the fourth data.

In accordance with another implementation, the trainer component 108 can train the model to detect respective fingerprints of third metadata associated with the third communication network packet flow and fourth metadata associated with the fourth communication network packet flow based on known fingerprints of the first metadata and the second metadata.

The respective one or more memories (e.g., the at least one memory 116, the at least one memory 124) can be operatively coupled to the respective one or more processors (e.g., the at least one processor component 114, the at least one processor component 122). The respective one or more memories (e.g., the at least one memory 116, the at least one memory 124) can store protocols associated with facilitating machine learning and detection of behaviors based on communication packet flows in a communications network as discussed herein. Further, the respective one or more memories (e.g., the at least one memory 116, the at least one memory 124) can facilitate action to control communication between the network device 102, the communication device 104, other network devices, and/or other mobile devices such that the communications system 100 can employ stored protocols and/or algorithms to achieve improved communications in a wireless network as described herein.

It should be appreciated that data store (e.g., memories) components described herein can be either volatile memory or nonvolatile memory, or can include both volatile and nonvolatile memory. By way of example and not limitation, nonvolatile memory can include Read Only Memory (ROM), Programmable ROM (PROM), Electrically Programmable ROM (EPROM), electrically erasable ROM (EEPROM), or flash memory. Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to comprise, without being limited to, these and other suitable types of memory.

The respective processors (e.g., the at least one processor component 114, the at least one processor component 122) can facilitate improvements to achieve transmission diversity in a communication network. The processors (e.g., the at least one processor component 114, the at least one processor component 122) can be processors dedicated to analyzing and/or generating information received, processors that control one or more components of the communications system 100, and/or processors that both analyze and generate information received and control one or more components of the communications system 100.

Figure 2:
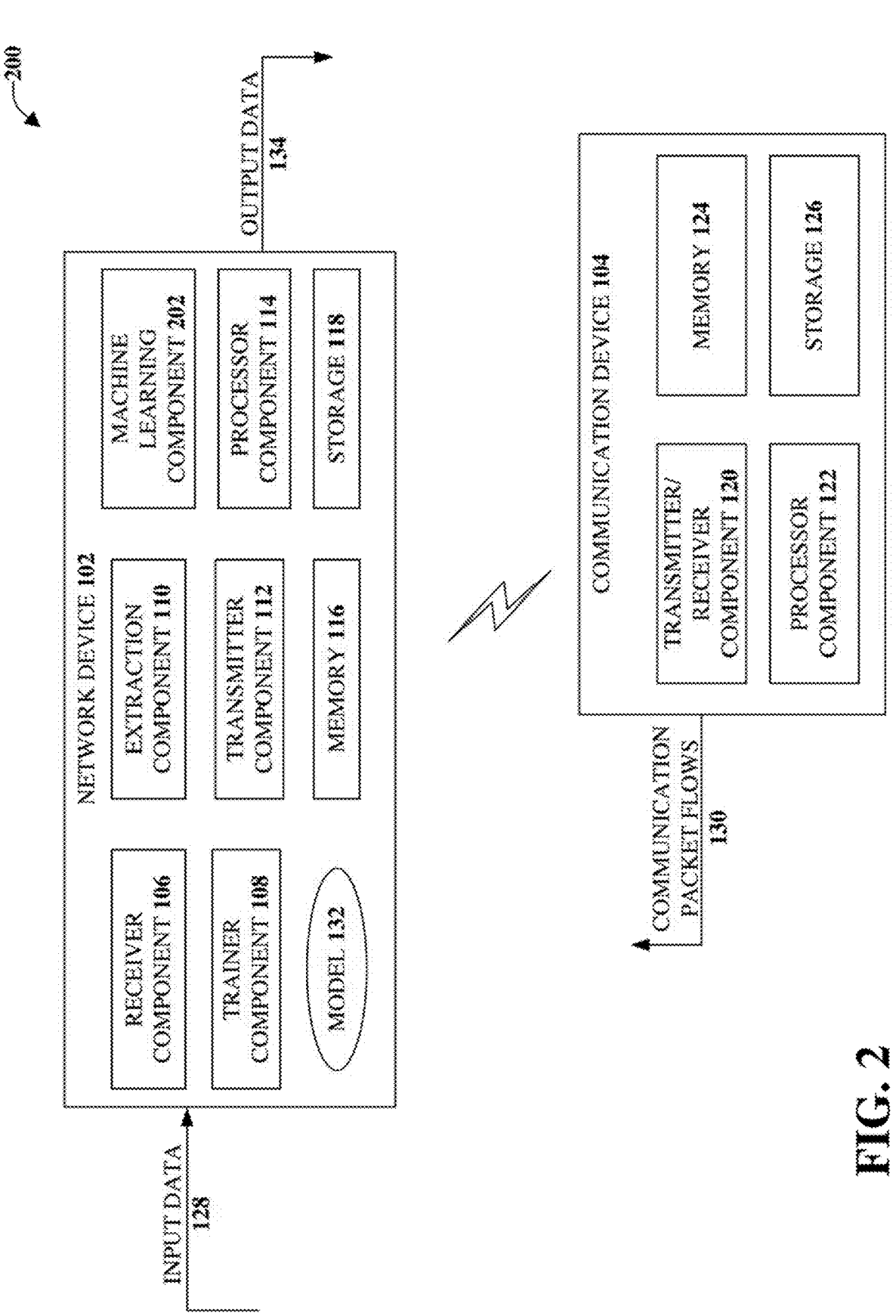
FIG. 2 illustrates an example, non-limiting, system that employs automated learning to facilitate one or more of the disclosed aspects in accordance with one or more embodiments described herein.

FIG. 2 illustrates an example, non-limiting, system 200 that employs automated learning to facilitate one or more of the disclosed aspects in accordance with one or more embodiments described herein. Repetitive description of like elements employed in other embodiments described herein is omitted for sake of brevity. The system 200 can comprise one or more of the components and/or functionality of the communications system 100 and vice versa.

As illustrated, the network device 102 can comprise a machine learning and reasoning component 202 that can be utilized to perform predictive machine learning and to automate one or more of the disclosed aspects. The machine learning and reasoning component 202 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 202 can employ principles of probabilistic and decision theoretic inference. Additionally, or alternatively, the machine learning and reasoning component 202 can rely on predictive models constructed using machine learning and/or automated learning procedures. Logic-centric inference can also be employed separately or in conjunction with probabilistic methods.

The machine learning and reasoning component 202 can infer usage of the communications network by one or more communication devices (e.g., the communication device 104) by obtaining knowledge about websites visited, applications executing on (or through) the communication device 104, programs being utilized by the communication device 104, or combinations thereof. Based on this knowledge, the machine learning and reasoning component 202 can make an inference based on preferences of an anonymized user, activities of an anonymized user, usage of a communication device, network access by a communication device, or combinations thereof.

As used herein, the term "inference" refers generally to the process of reasoning about or inferring states of a system, a component, a module, an environment, and/or devices from a set of observations as captured through events, reports, data and/or through other forms of communication. Inference can be employed to identify usage of a communication device (e.g., tethering at the communication device), actions and/or preferences of a user of a communication device, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with applying machine learning to detect off-plan tethering, unintended consequences resulting from actions of a communication device that can shorten a machine-learning cycle, and so forth) can employ various artificial intelligence-based schemes for carrying out various aspects thereof. For example, a process for determining if a particular communication device is utilized as a tethering point for other devices can be performed and/or whether an action of the communication device (e.g., entering/exiting airplane mode) indicates a pattern can be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to provide a prognosis and/or or infer one or more actions that should be employed, based on the information obtained, and which actions should be automatically performed. In the case of actions, for example, attributes can be identification of usage of a communication device (e.g., tethering) and/or patterns indicating user preferences and the classes are criteria of the usage of the communication device (e.g., authorized or unauthorized) and/or targeted electronic messages provided based on the user preferences.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing communication device behavior, by receiving extrinsic information, and so on). For example, SVM's can be configured through a learning or training phase within a classifier constructor and feature selection module. Thus, a classifier(s) can be used to automatically learn and perform a number of functions, including but not limited to determining according to predetermined criteria when to implement an action (e.g., disabling a tethering option, providing an electronic communication, and so on), which action to implement, what actions to group together, relationships between actions, and so forth. The criteria can include, but is not limited to, current information, historical information, and so forth.

Additionally, or alternatively, an implementation scheme (e.g., a rule, a policy, and so on) can be applied to control and/or regulate communication device behavior and resulting actions, privileges, and so forth. In some implementations, based upon a predefined criterion, the rules-based implementation can automatically and/or dynamically interpret communication device behavior. In response thereto, the rule-based implementation can automatically interpret and carry out functions associated with the communication device behavior by employing a predefined and/or programmed rule(s) based upon any desired criteria.

Figure 3:
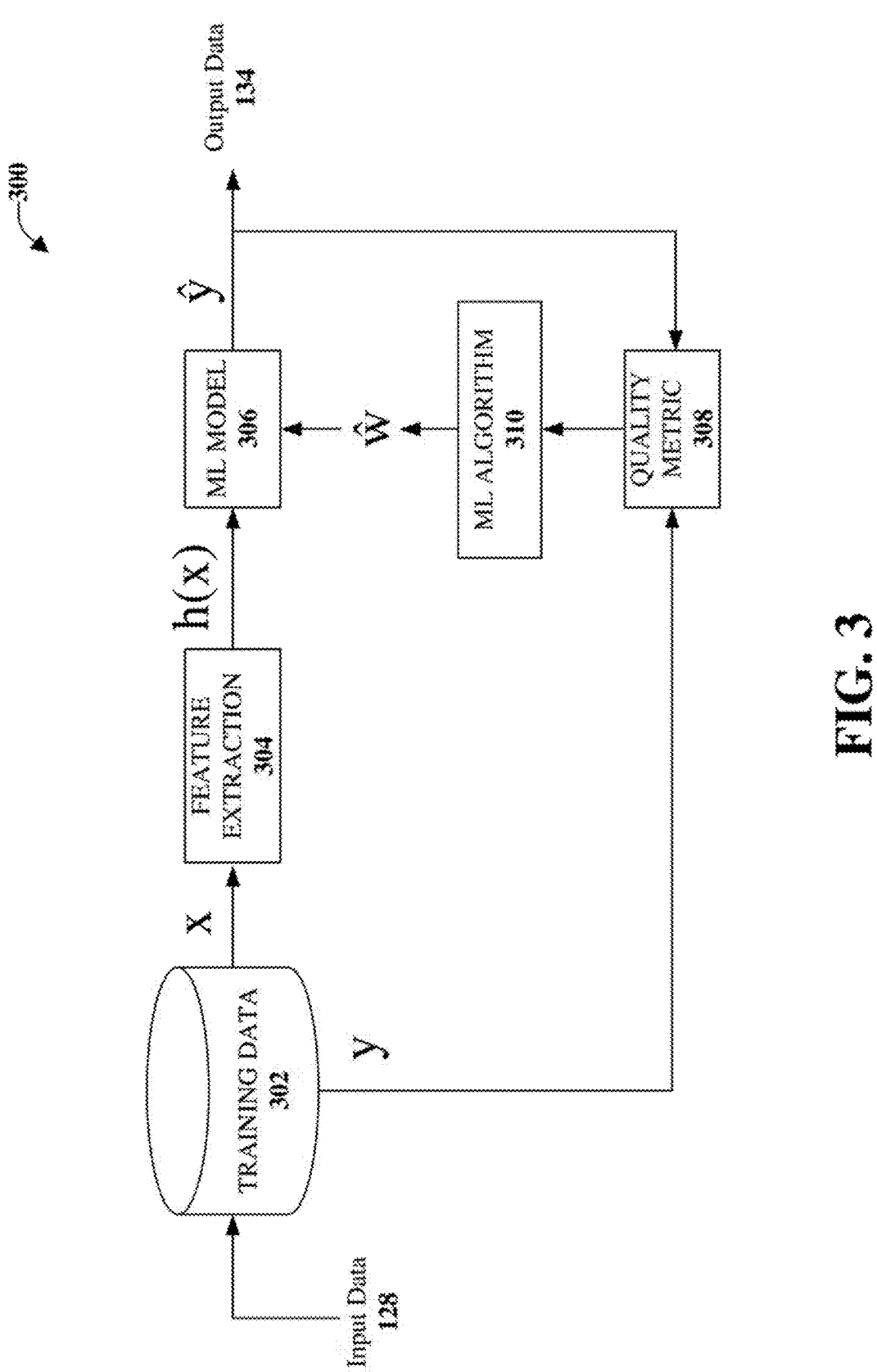
FIG. 3 illustrates an example, non-limiting, flow diagram for machine/deep learning in accordance with one or more embodiments described herein.

FIG. 3 illustrates an example, non-limiting, flow diagram 300 for machine/deep learning in accordance with one or more embodiments described herein. Repetitive description of like elements employed in other embodiments described herein is omitted for sake of brevity. The flow diagram 300 can be utilized and/or can comprise one or more of the components and/or functionality of the communications system 100, the system 200, and vice versa.

In various embodiments, the systems discussed herein can be classification computing systems associated with technologies such as, but not limited to, communication technologies, computing technologies, artificial intelligence technologies, object classification technologies, and/or other digital technologies. The systems can employ hardware and/or software to solve problems that are highly technical in nature (e.g., determine usage of a communication network, determine tethering associated with one or more communication devices in the communication network, determine preferences of a user of a communication device, and so on. For example, the systems can extract respective electronic data (e.g., usage parameters, fingerprint data, and so on) from a group of communication packets, analyze the respective electronic data, and classify patterns across electronic data of the respective electronic data, that are not abstract and that cannot be performed as a set of mental acts by a human. For example, the electronic data received can be complex data that have not previously been analyzed by the system, and which comprise interleaving data that are difficult (or impossible) to distinguish with the human mind or the human eye. Further, the number of communication packets received and associated data contained therein can be a large volume, which a human could not possibly automatically (e.g., within a matter of seconds or less) and consistently accurately process as discussed herein (e.g., identify data within the communication packets, extract the data, and perform classification of the extracted data). Further, in certain embodiments, some of the processes performed can be performed by one or more specialized computers (e.g., one or more specialized processing units, a specialized computer with a classification computing component, a specialized data classification model, etc.) to carry out defined tasks related to machine learning and data classification as discussed herein.

Machine Learning is a data-driven, artificial intelligence approach using algorithms that learn from and make determinations about the data provided to them. As illustrated, input data 128 can received (e.g., via the receiver component 106) and utilized as training data 302, which can be retained in a data store (e.g., the at least one memory 116, the at least one storage 118). In an example, the input data 128 can be positive packet flows and/or negative packet flows corresponding (respectively) to tethered/non-tethered subscriber activity. In another example, the input data can be Domain Name System (DNS) traffic after an "airplane mode" is turned off at the communication device (e.g., the communication device 104).

The training data 302 can comprise multiple data points x, which can undergo feature extraction 304 (e.g., via the extractor component 110). A predictor h(x) can be established and utilized to train a machine learning model 306 (e.g., the trainer component 108, the machine learning and reasoning component 202) during the training phase. For example, during the training phase, for the input value x, there can be a corresponding output y, that is known in advance. For each example, the difference between the known, correct value y and the predicted value h(x) can be determined. Over time, the value of h(x) can be modified to result in more accurate predictions (e.g., a defined level of confidence).

Upon or after the initial training phase as more training data 302 is received (e., the input data 128), feature extraction 304 is performed and the predicted value h(x) can be processed by the machine learning model 306 (e.g., the model 132) to determine an output ŷ. In an example, the output ŷ can be a determination whether tethering is being performed or is not being performed. In another example, the output ŷ can include an identification of an application, a website, a location in a website, and/or other information associated with one or more communication devices.

The output ŷ can be compared with the output y, to determine a quality metric 308 (e.g., a defined level of confidence), such as through a feedback loop. Based on result of the comparison a machine learning algorithm 310 can be updated and the changes w to the algorithm can be provided to the machine learning model 306 to further train the machine learning model 306.

Figure 4:
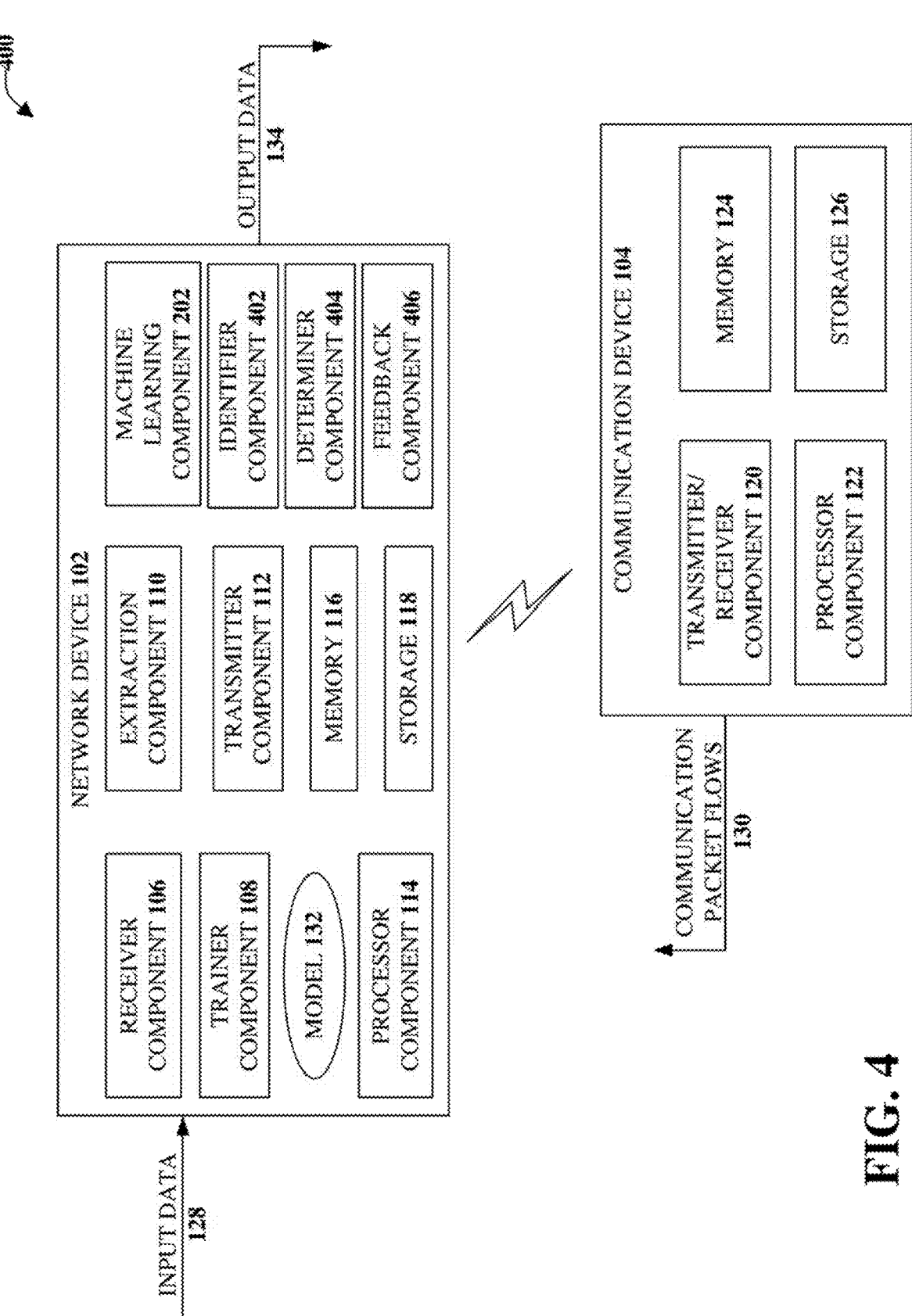
FIG. 4 illustrates an example, non-limiting, system that identifies parameters of input data and implements one or more actions based on the identified parameters in accordance with one or more embodiments described herein.

FIG. 4 illustrates an example, non-limiting, system 400 that identifies parameters of input data and implements one or more actions based on the identified parameters in accordance with one or more embodiments described herein. Repetitive description of like elements employed in other embodiments described herein is omitted for sake of brevity. The system 400 can comprise one or more of the components and/or functionality of the communications system 100, the system 200, the flow diagram 300, and vice versa.

As illustrated, the network device 102 can comprise an identifier component 402, a determiner component 404, and a feedback component 406. As discussed, the machine learning and reasoning component 202 can be utilized for predictive machine learning on the input data 128.

The identifier component 402 can identify overlapping web page displays of the web page displays that are associated with the communication device 104. For example, overlapping web page displays can indicate that more than one communication device is interacting with web pages. Further, the determiner component 404 can determine that tethering is occurring at the communication device based on the overlapping web pages displays. For example, through the communication device 104, a first communication device can be accessing a first web page and a second communication device can be accessing a second web page (where one of the first communication device or the second communication device can be the communication device 104).

The identifier component 402 can identify the overlapping web page displays based on an analysis of respective spectroscopic signatures associated with the web page displays. In an example, the respective spectroscopic signatures can indicate respective websites associated with the overlapping web page displays. In another example, the respective spectroscopic signatures can indicate interactions associated with the overlapping web page displays.

Further, the network device 102 can comprise a feedback component 406 that can input newly received information and predicted information to the trainer component 108 and/or the machine learning and reasoning component 202. For example, an accuracy level of the output data 134 can be determined (e.g., via the extractor component 110, the machine learning and reasoning component 202, or another system component). The output data 134 and related data (e.g., the third data, the fourth data) can be fedback to the model 132, which can be retrained based on the newly received data.

As discussed herein, an implementation relates to detecting tethering performed by mobile subscribers whose plan does not include a tethering option. Authorized tethering, namely tethering that has been requested by the client and confirmed by look-up during session set-up, can be easy to detect (e.g., Access Point Name (APN) string contains "broadband"). Unauthorized tetherers jailbreak their phones to avoid the confirmation step by hiding their tethering to appear as a standard data connection (e.g., APN string is "nxtgenphone"). Current detection uses deep packet inspection (DPI) to look for incongruous activity (e.g., a first manufacturer operating system update request from second manufacturer phone, where the first manufacturer and the second manufacturer are competitors). Problems associated with current detection include that the approach is limited (e.g., need to explicitly look for specific incongruities), detection is conducted after the fact using historical data in a database, and increasing use of encryption HyperText Transfer Protocol Secure (HTTPS) is making DPI-based techniques null and void.

The various aspects provided herein can operate at scale and, thus, can handle nationwide packet rates of over 2.4 Terabytes per second (Tbps). Further, the disclosed aspects can operate at near real-time (e.g., can detect tethering as it is happening). In addition, the disclosed aspects can operate in the presence of encryption, namely HTTPS, and/or can operate without using DPI.

According to various experiments, a machine learning model achieved at least an eighty-seven percent accuracy level in identifying tethering using real data collected from 721 clients. It is noted that in accordance with one or more implementations described in this disclosure, users (e.g., clients) can opt-out of providing personal information, demographic information, location information, proprietary information, sensitive information, or the like in connection with data gathering aspects. Moreover, one or more implementations described herein may provide for anonymizing collected, received, and/or transmitted data. Further, a user can opt-out of providing information at any time, regardless of whether the user previously opted-in to providing the information.

For the experiment, the model was trained with the following seven "features" extracted from every packet: flows (e.g., the bi-direction channel/tunnel between the mobile subscriber and a web page); up/down link counts; packets; DNS lookups; TCP handshakes (SYN/SYNACK/ACK). These features were selected in order for the model to "learn" when the contents from multiple web pages were flowing to a SUB at approximately the same time.

Figure 5:
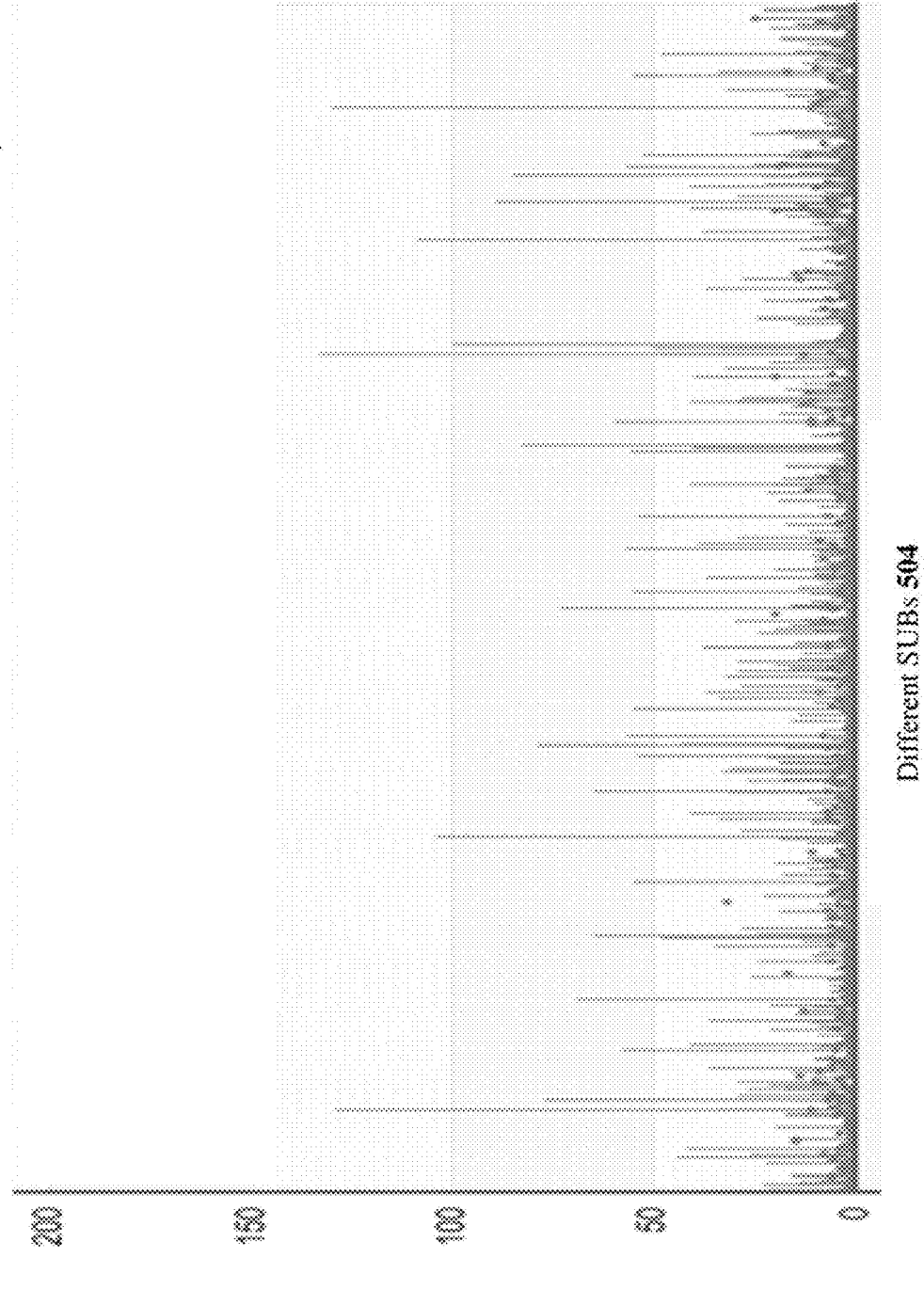
FIG. 5 illustrates an example, non-limiting, chart of experimental results of detected tethering in accordance with one or more embodiments described herein.

For example, FIG. 5 illustrates an example, non-limiting, chart 500 of experimental results of detected tethering in accordance with one or more embodiments described herein. In this example, tethering was detected based on the APN string containing "broadband." The vertical or Y axis 502 represents the unique flows during a defined time period (e.g., three seconds). The horizontal or X axis 504 represents the number of SUBs. The chart 500 illustrates the result from 2,480 different SUBs being analyzed.

Figure 6:
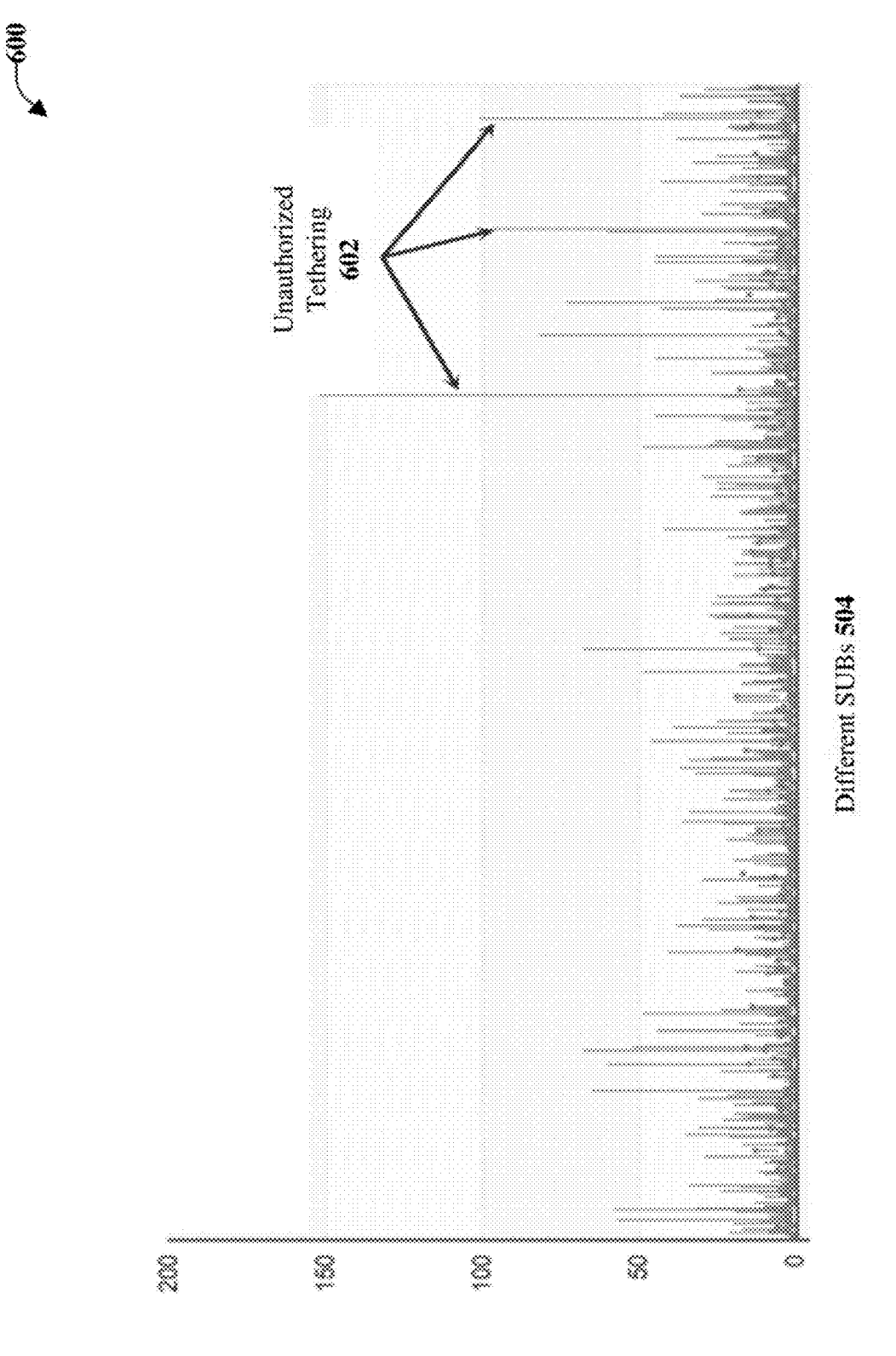
FIG. 6 illustrates an example, non-limiting, chart of experimental results of detected not tethering in accordance with one or more embodiments described herein.

Further, FIG. 6 illustrates an example, non-limiting, chart 600 of experimental results of detected not tethering in accordance with one or more embodiments described herein. In this example, tethering was detected based on the Access Point Name (APN) string containing "nxtgenphone." The chart 600 illustrates the result of 3,841 different SUBs being analyzed. Unauthorized tethering is indicated by the three arrows at 602.

Figure 7:
FIG. 7 illustrates an example, non-limiting, notched box plot in accordance with one or more embodiments described herein.
Figure 8:
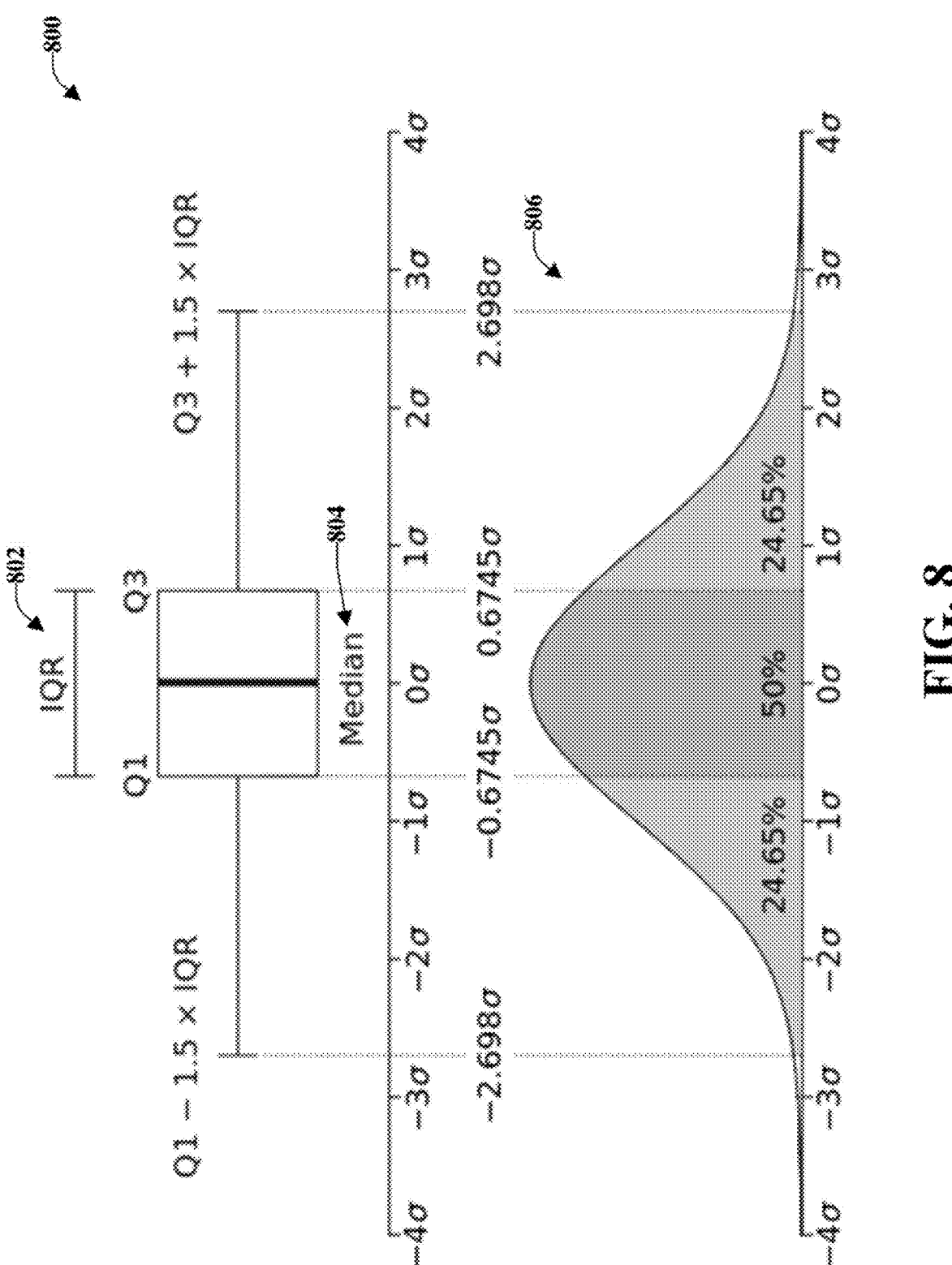
FIG. 8 illustrates a distribution of the notched box plot of FIG. 7 in accordance with one or more embodiments described herein.

FIG. 7 illustrates an example, non-limiting notched box plot 700 in accordance with one or more embodiments described herein. FIG. 8 illustrates a distribution of the notched box plot of FIG. 7 in accordance with one or more embodiments described herein. FIGS. 7 and 8 are provided to explain further details of the disclosed aspects.

Box plots succinctly display the range of a set of data values in terms of their quartiles (the box or Inter-Quartile Region (IQR 802 of FIG. 8)), as well as variability beyond the quartiles (the whiskers or 1.5×IQR), and the outlying points beyond the whiskers. It is noted that if the notches of two plots do not overlap, this is 'strong evidence' that the two medians differ. As illustrated the example includes two groups (e.g., a first group 702 and a second group 704 plotted along a vertical range 706 (e.g., 0 to 100).

The median value 804 or second quartile (Q2) is the 50/50 point. At this point, half the data lies above and half below the median value 804. Q1 is the 25/75 point and Q3 is the 75/25 point. Although box plots make no assumptions about the underlying statistical distribution, it can be helpful to think about the box plot of a normal distribution 806, as illustrated at the bottom of FIG. 8.

Figure 9:
FIG. 9 illustrates example, non-limiting plots comparing flow concurrency between a tethered group and a non-tethered group in accordance with one or more embodiments described herein.

FIG. 9 illustrates example, non-limiting plots 900 comparing flow concurrency between a tethered group and a non-tethered group in accordance with one or more embodiments described herein. Illustrated on the vertical or Y axis 902 is the concurrent flows in a defined time window (e.g., a three second time window for this experiment). Illustrated on the horizontal or X axis 904 are data sets for flows.

A first group comprises non-tethered devices 906 comprising a quantity of 1,652 devices. A second group comprises tethered devices 908 comprising a quantity of 841 devices. As indicated by arrows 910 and 912, there is little overlap between the two boxplots. The lack of overlap indicates that concurrent flows are a positive indicator of web page overlap.

FIG. 10 illustrates example, non-limiting plots 1000 comparing uplink packet counts between a tethered group and a non-tethered group in accordance with one or more embodiments described herein. The Y axis 1002 represents concurrent communication device (or mobile station (MS)) to network (NW) packets (e.g., MS-to-NW packets) over a three second window. The X axis 1004 represents the data sets for MS-to-NW packets. The plots 1000 are for the non-tethered devices 906 and the tethered devices 908.

Figure 11:
FIG. 11 illustrates example, non-limiting plots comparing downlink packet counts between a tethered group and a non-tethered group in accordance with one or more embodiments described herein.

FIG. 11 illustrates n example, non-limiting plots 1100 comparing downlink packet counts between a tethered group and a non-tethered group in accordance with one or more embodiments described herein. The Y axis 1102 represents concurrent communication MS-to-NW packets over a three second window. The X axis 1104 represents the data sets for NW-to-MS packets. The plots 1100 are for the non-tethered devices 906 and the tethered devices 908.

Figure 12:
FIG. 12 illustrates example, non-limiting plots comparing uplink domain name system activity between a tethered group and a non-tethered group in accordance with one or more embodiments described herein.

FIG. 12 illustrates example, non-limiting plots 1200 comparing uplink DNS activity between a tethered group and a non-tethered group in accordance with one or more embodiments described herein. The Y axis 1202 represents concurrent MS-to-NW DNS over a three second window. The X axis 1204 represents the data sets for MS-to-NW DNS. The plots 1200 are for the non-tethered devices 906 and the tethered devices 908.

Figure 13:
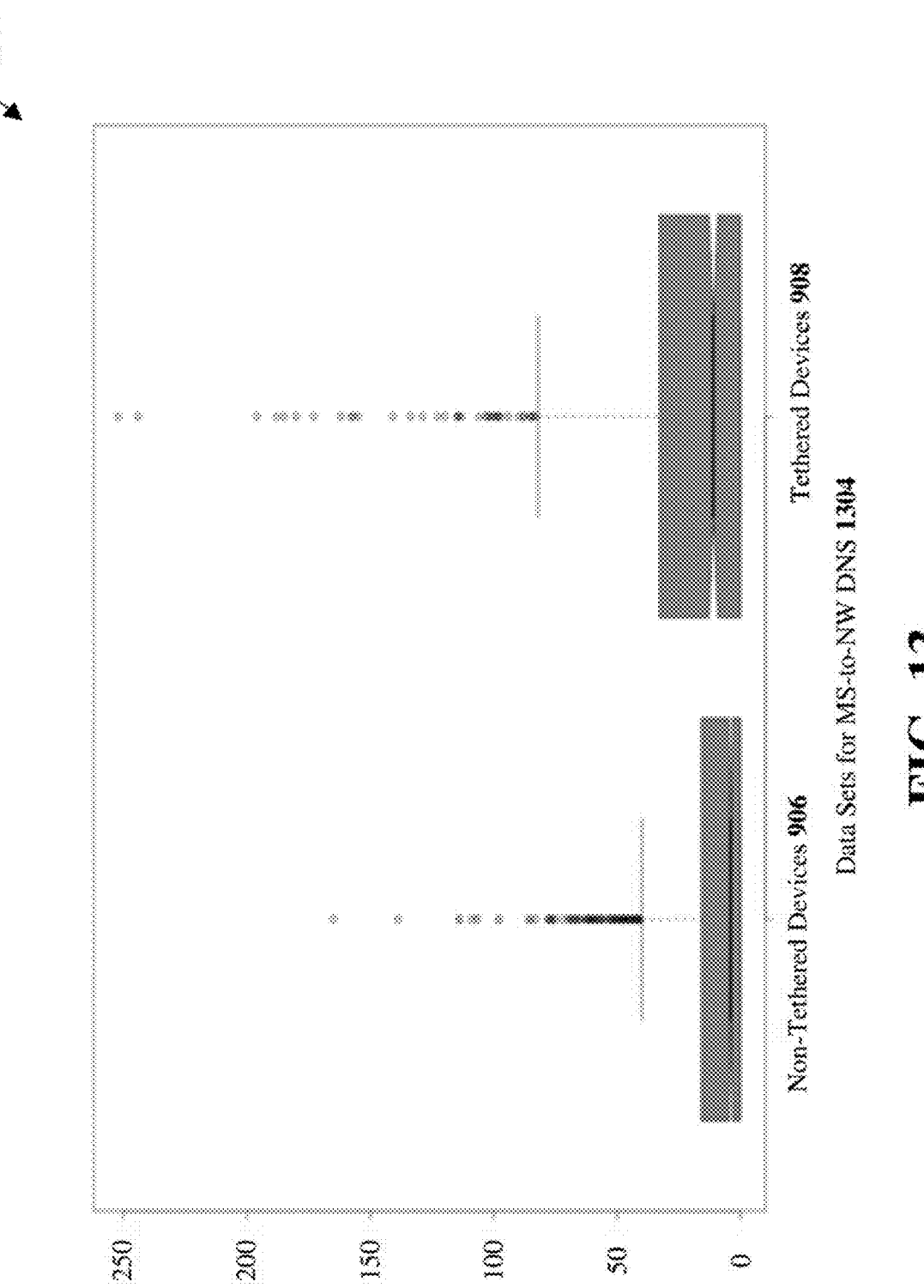
FIG. 13 illustrates example, non-limiting plots comparing downlink domain name system activity between a tethered group and a non-tethered group in accordance with one or more embodiments described herein.

FIG. 13 illustrates example, non-limiting plots 1300 comparing downlink DNS activity between a tethered group and a non-tethered group in accordance with one or more embodiments described herein. The Y axis 1302 represents concurrent NW-to-MS DNS over a three second window. The X axis 1304 represents the data sets for MS-to-NW DNS. The plots 1300 are for the non-tethered devices 906 and the tethered devices 908.

Figure 14:
FIG. 14 illustrates example, non-limiting plots comparing uplink synchronize/acknowledge occurrences between a tethered group and a non-tethered group in accordance with one or more embodiments described herein.

FIG. 14 illustrates example, non-limiting plots 1400 comparing uplink synchronize/acknowledge (SYN/ACK) occurrences between a tethered group and a non-tethered group in accordance with one or more embodiments described herein. The Y axis 1402 represents concurrent MS-to-NW SYN/ACK over a three second window. The X axis 1404 represents the data sets for MS-to-NW SYN/ACK. The plots 1400 are for the non-tethered devices 906 and the tethered devices 908.

Figure 15:
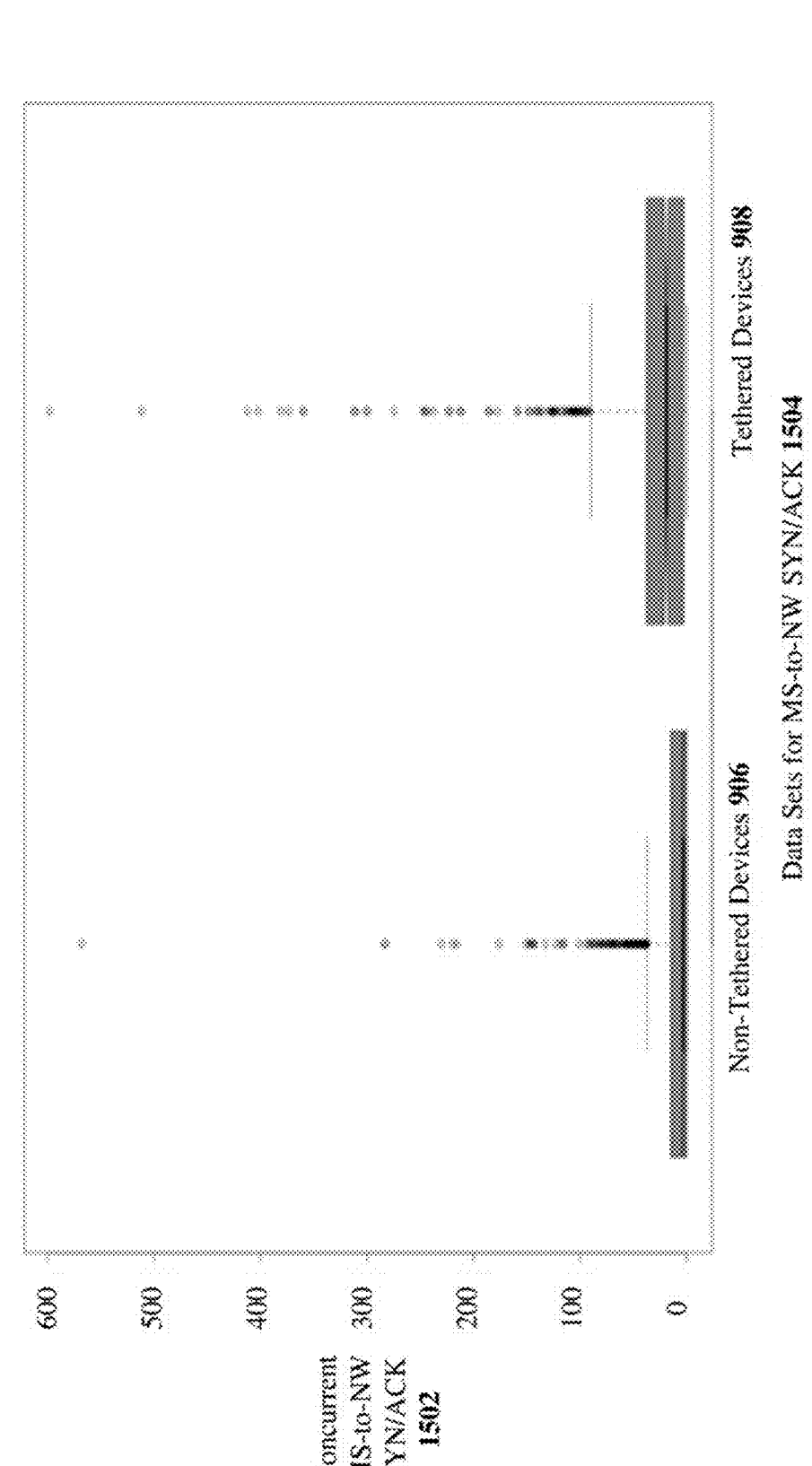
FIG. 15 illustrates example, non-limiting plots comparing downlink synchronize/acknowledge occurrences between a tethered group and a non-tethered group in accordance with one or more embodiments described herein.

FIG. 15 illustrates example, non-limiting plots 1500 comparing downlink SYN/ACK occurrences between a tethered group and a non-tethered group in accordance with one or more embodiments described herein. The Y axis 1502 represents concurrent MS-to-NW SYN/ACK over a three second window. The X axis 1504 represents the data sets for NW-to-MS SYN/ACK. The plots 1500 are for the non-tethered devices 906 and the tethered devices 908.

According to another aspect, a state of a communication device can be utilized to shorten a machine-learning cycle. Various data can be statistically more likely to correspond to a particular action performed by a user on their communication device. In an example, the action can be enabling and/or disabling an "airplane-mode" of the communication device. It is noted that device actions (e.g., adjusting volume, pausing a video, enabling/disabling airplane-mode) are not transmitted over the network. However, these actions can be inferred with the assistance of additional information that is transmitted. For example, location information can provide valuable information.

Enabling/disabling airplane-mode can have the undesirable (or desirable if the goal is to understand network traffic patterns) side-effect of clearing the DNS cache. An empty DNS cache results in a significant burst of requests from both foreground and background applications. For example, passengers arriving at an airport can be anxious to reconnect with their communication devices. Thus, empty DNS caches and multiple disabling of airplane-mode can provide a wealth of training data.

FIG. 16 illustrates an example, non-limiting, geo-fence within a defined geographic area in accordance with one or more embodiments described herein. Illustrated is a screen shot 1600 of portion of an airport (e.g., Dulles International Airport). The geo-fence 1602 is represented by the circle. The geo-fence 1602 is a location where a common event occurs on a large scale. In the case of the airport, the geo-fence 1602 represents an area where multiple devices are exhibiting behavior of an empty DNS cache and activation of communication devices (e.g., airplane mode is turned off). Accordingly, the geo-fence 1602 is around an area where airplanes land and passengers are permitted to use their respective communication devices. For example, many passengers turn off airplane-mode immediately, or shortly after, the wheels of the airplane touch the runway.

Figure 17:
FIG. 17 illustrates an example, non-limiting, plot or a representation of airplane arrivals based on mined communication device data in accordance with one or more embodiments described herein.

FIG. 17 illustrates an example, non-limiting, plot 1700 or a representation of airplane arrivals based on mined communication device data in accordance with one or more embodiments described herein. The Y axis 1702 represents the quantity of communication devices and the X axis 1704 represents time. A first set of spikes in the data 1706 and a second set of spikes in the data 1708 represent linear growth (e.g., cumulative) corresponding to flight arrivals.

FIG. 18 illustrates an example, non-limiting, plot 1800 or representation of cumulative airport arrival frequency by cell tower in accordance with one or more embodiments described herein. The Y axis 1802 represents the quantity of communication devices and the X axis 1804 represents cell tower identifiers (not labeled for purposes of simplicity). Additionally, the most popular domains that are accessed upon or after (e.g., within a few minutes after) the plane lands can be determined, as well as other information.

FIG. 19 illustrates an example, non-limiting, method 1900 for determining behaviors associated with one or more communication packet flows in accordance with one or more embodiments described herein. At 1902, a model can be trained using, as inputs to the model, identified communication packet flows that comprise respective fingerprint data. Training the model can comprise training the model to detect the respective fingerprint data with at least a defined level of confidence. In an example, the respective fingerprint data can comprise respective domain name system signatures that exhibit properties defined to be stable properties. In another example, the respective fingerprint data can comprise domain name system traffic of an application executing on mobile devices within the communications network.

Further, at 1904, a pattern of use of a received communication packet flow received by the system can be identified based on detection of fingerprint data of the received communication packet flow data with at least the defined level of confidence. The fingerprint data can be detected based on the model.

Figure 20:
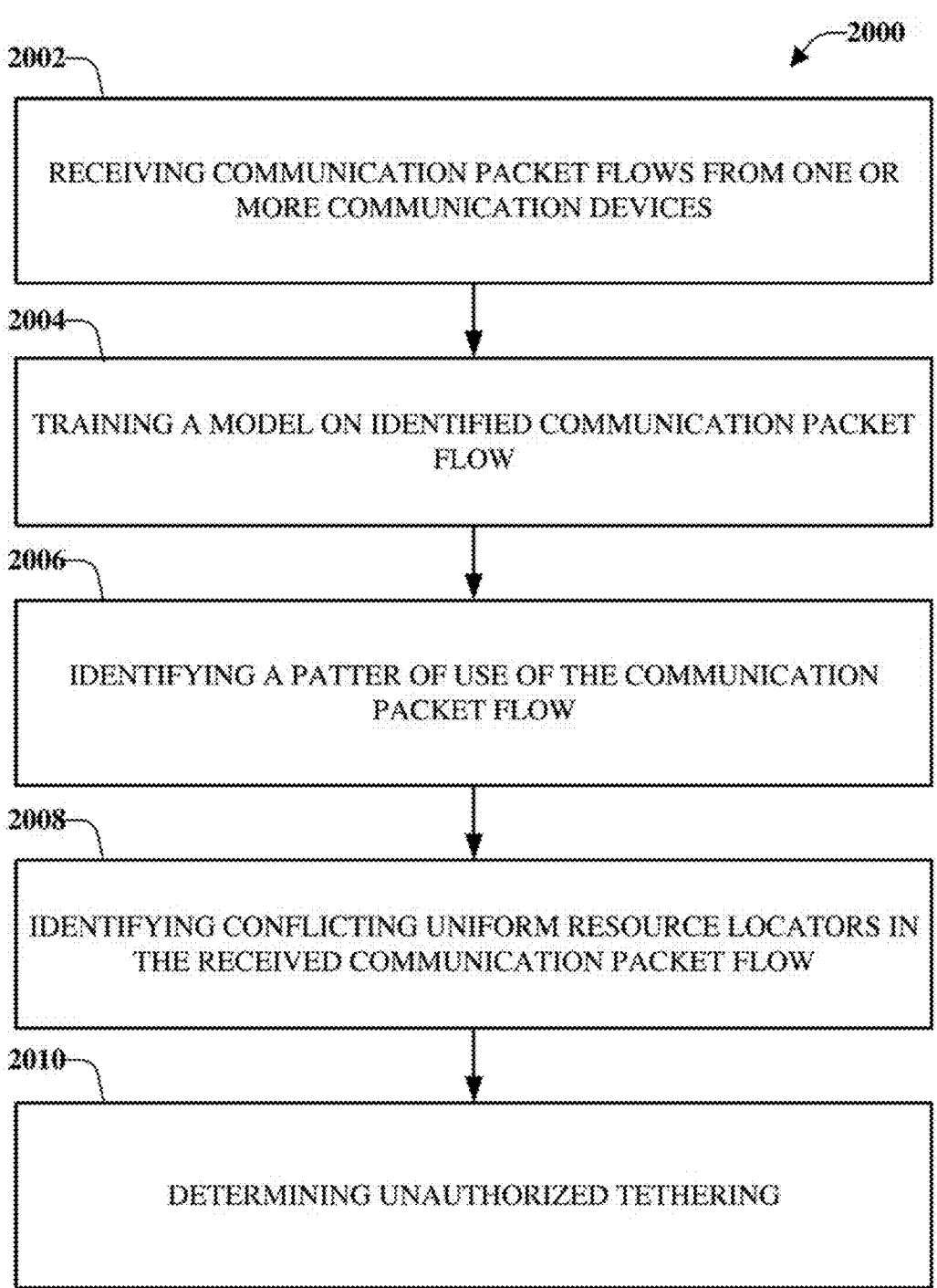
FIG. 20 illustrates an example, non-limiting, method for determining unauthorized tethering of a communication device in accordance with one or more embodiments described herein.

As discussed herein, web page spectroscopy refers to using machine learning algorithms on network packet data (e.g., headers only) and/or meta-data describing the packet flows in order to identify various aspects about the web page itself. For example, web page content can be displayed in a highly concurrent manner by javascript executing many AJAX threads in parallel. This noticeable burst of concurrency creates a storm of activity on the network ranging from DNS lookups to TCP handshakes (SYN/SYNACK/ACK). Analysis of this "burst" has been equated herein with the field of spectroscopy and instead of light or chemical properties, the spectroscopy discussed herein analyzes network properties. The machine learning and training of the model can be facilitated by feeding actual anonymous network traffic as training data so that the model can continuously improve. In an example, spectroscopy can be utilized to identify overlapping web page displays which is a strong indicator of tethering FIG. 20 illustrates an example, non-limiting, method 2000 for determining unauthorized tethering of a communication device in accordance with one or more embodiments described herein. At 2002, one or more communication packet flows can be received. The communication packet flows can comprise respective fingerprint data. A model can be trained, at 2004, based on identified communication packet flows. For example, the model can be trained to detect the respective fingerprint data with a defined level of confidence. Further, at 2006, a pattern of use of the received communication packet flow can be identified. The identification can be based on detection of fingerprint data of the received communication packet flow based on the defined level of confidence.

At 2008, conflicting uniform resource locators in the received communication packet flow can be identified. In an example, identifying the conflicting uniform resource locators can comprise analyzing the fingerprint data for respective domain name system traffic related to the conflicting uniform resource locators. In an example, the respective fingerprint data can comprise respective domain name system signatures that exhibit properties defined to be stable properties. Further, at 2010, an unauthorized tethering of a communication device can be determined based on the conflicting uniform resource locators.

According to some implementations, the model can be retrained based on newly received data. For example, after the pattern of use is identified (e.g., at 1904 of FIG. 19, at 1906 of FIG. 20), an accuracy of the pattern of use can be determined. The model can be retrained based on the identified communication packet flows and the received communication packet flow as a function of the accuracy of the pattern of use and at least the defined level of confidence.

The term "mobile device" can be interchangeable with (or include) a User Equipment (UE) or other terminology. Mobile device (or UE) refers to any type of wireless device that communicates with a radio network node in a cellular or mobile communication system. Examples of UEs include, but are not limited to, a target device, a Device to Device (D2D) UE, a machine type UE or a UE capable of Machine to Machine (M2M) communication, a Personal Digital Assistant (PDA), a tablet, a mobile terminal, a smart phone, a Laptop Embedded Equipment (LEE), a Laptop Mounted Equipment (LME), a Universal Serial Bus (USB) dongle, and so on.

As used herein, the term "network device" can be interchangeable with (or include) a network, a network controller or any number of other network components. Further, as utilized herein, the non-limiting term radio network node, or simply network node (e.g., network device, network node device) is used herein to refer to any type of network node serving communication devices and/or connected to other network nodes, network elements, or another network node from which the communication devices can receive a radio signal. In cellular radio access networks (e.g., Universal Mobile Telecommunications System (UMTS) networks), network devices can be referred to as Base Transceiver Stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices can also comprise multiple antennas for performing various transmission operations (e.g., Multiple Input Multiple Output (MIMO) operations). A network node can comprise a cabinet and other protected enclosures, an antenna mast, and actual antennas. Network devices can serve several cells, also called sectors, depending on the configuration and type of antenna. Examples of network nodes or radio network nodes (e.g., the network device 102) can include but are not limited to: NodeB devices, Base Station (BS) devices, Access Point (AP) devices, TRPs, and Radio Access Network (RAN) devices. The network nodes can also include Multi-Standard Radio (MSR) radio node devices, comprising: an MSR BS, a gNodeB, an eNode B, a network controller, a Radio Network Controller (RNC), a Base Station Controller (BSC), a relay, a donor node controlling relay, a Base Transceiver Station (BTS), an Access Point (AP), a transmission point, a transmission node, a Remote Radio Unit (RRU), a Remote Radio Head (RRH), nodes in Distributed Antenna System (DAS), and the like.

Described herein are systems, methods, articles of manufacture, and other embodiments or implementations that can facilitate web page spectroscopy in a communication network. Facilitating web page spectroscopy can be implemented in connection with any type of device with a connection to the communication network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or LTE, or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. Accordingly, systems, methods, and/or machine-readable storage media for facilitating improvements to the uplink performance for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Figure 21:
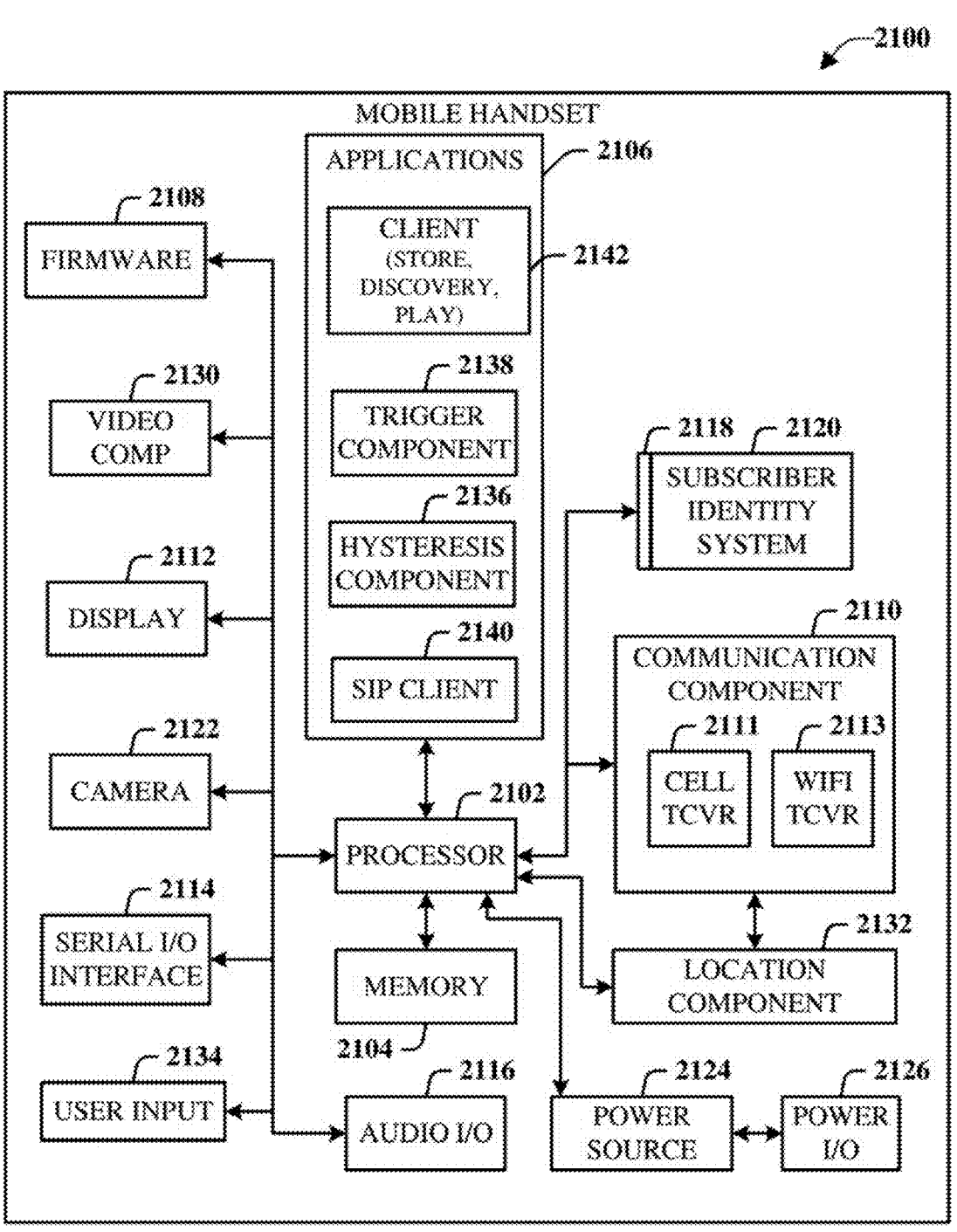
FIG. 21 illustrates an example block diagram of an example mobile handset operable to engage in a system architecture that facilitates wireless communications according to one or more embodiments described herein.

Referring now to FIG. 21, illustrated is an example block diagram of an example mobile handset 2100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 2102 for controlling and processing all onboard operations and functions. A memory 2104 interfaces to the processor 2102 for storage of data and one or more applications 2106 (e.g., a video player software, user feedback component software, etc.). Other applications can include voice recognition of predetermined voice commands that facilitate initiation of the user feedback signals. The applications 2106 can be stored in the memory 2104 and/or in a firmware 2108, and executed by the processor 2102 from either or both the memory 2104 or/and the firmware 2108. The firmware 2108 can also store startup code for execution in initializing the handset 2100. A communications component 2110 interfaces to the processor 2102 to facilitate wired/wireless communication with external systems, e.g., cellular networks, VoIP networks, and so on. Here, the communications component 2110 can also include a suitable cellular transceiver 2111 (e.g., a GSM transceiver) and/or an unlicensed transceiver 2113 (e.g., Wi-Fi, WiMax) for corresponding signal communications. The handset 2100 can be a device such as a cellular telephone, a PDA with mobile communications capabilities, and messaging-centric devices. The communications component 2110 also facilitates communications reception from terrestrial radio networks (e.g., broadcast), digital satellite radio networks, and Internet-based radio services networks.

The handset 2100 includes a display 2112 for displaying text, images, video, telephony functions (e.g., a Caller ID function), setup functions, and for user input. For example, the display 2112 can also be referred to as a "screen" that can accommodate the presentation of multimedia content (e.g., music metadata, messages, wallpaper, graphics, etc.). The display 2112 can also display videos and can facilitate the generation, editing and sharing of video quotes. A serial I/O interface 2114 is provided in communication with the processor 2102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 2100, for example. Audio capabilities are provided with an audio I/O component 2116, which can include a speaker for the output of audio signals related to, for example, indication that the user pressed the proper key or key combination to initiate the user feedback signal. The audio I/O component 2116 also facilitates the input of audio signals through a microphone to record data and/or telephony voice data, and for inputting voice signals for telephone conversations.

The handset 2100 can include a slot interface 2118 for accommodating a SIC (Subscriber Identity Component) in the form factor of a card Subscriber Identity Module (SIM) or universal SIM 2120, and interfacing the SIM card 2120 with the processor 2102. However, it is to be appreciated that the SIM card 2120 can be manufactured into the handset 2100, and updated by downloading data and software.

The handset 2100 can process IP data traffic through the communications component 2110 to accommodate IP traffic from an IP network such as, for example, the Internet, a corporate intranet, a home network, a person area network, etc., through an ISP or broadband cable provider. Thus, VoIP traffic can be utilized by the handset 2100 and IP-based multimedia content can be received in either an encoded or a decoded format.

A video processing component 2122 (e.g., a camera) can be provided for decoding encoded multimedia content. The video processing component 2122 can aid in facilitating the generation, editing, and sharing of video quotes. The handset 2100 also includes a power source 2124 in the form of batteries and/or an AC power subsystem, which power source 2124 can interface to an external power system or charging equipment (not shown) by a power I/O component 2126.

The handset 2100 can also include a video component 2130 for processing video content received and, for recording and transmitting video content. For example, the video component 2130 can facilitate the generation, editing and sharing of video quotes. A location tracking component 2132 facilitates geographically locating the handset 2100. As described hereinabove, this can occur when the user initiates the feedback signal automatically or manually. A user input component 2134 facilitates the user initiating the quality feedback signal. The user input component 2134 can also facilitate the generation, editing and sharing of video quotes. The user input component 2134 can include such conventional input device technologies such as a keypad, keyboard, mouse, stylus pen, and/or touch screen, for example.

Referring again to the applications 2106, a hysteresis component 2136 facilitates the analysis and processing of hysteresis data, which is utilized to determine when to associate with the access point. A software trigger component 2138 can be provided that facilitates triggering of the hysteresis component 2136 when the Wi-Fi transceiver 2113 detects the beacon of the access point. A SIP client 2140 enables the handset 2100 to support SIP protocols and register the subscriber with the SIP registrar server. The applications 2106 can also include a client 2142 that provides at least the capability of discovery, play and store of multimedia content, for example, music.

The handset 2100, as indicated above related to the communications component 2110, includes an indoor network radio transceiver 2113 (e.g., Wi-Fi transceiver). This function supports the indoor radio link, such as IEEE 802.11, for the dual-mode GSM handset 2100. The handset 2100 can accommodate at least satellite radio services through a handset that can combine wireless voice and digital radio chipsets into a single handheld device.

Figure 22:
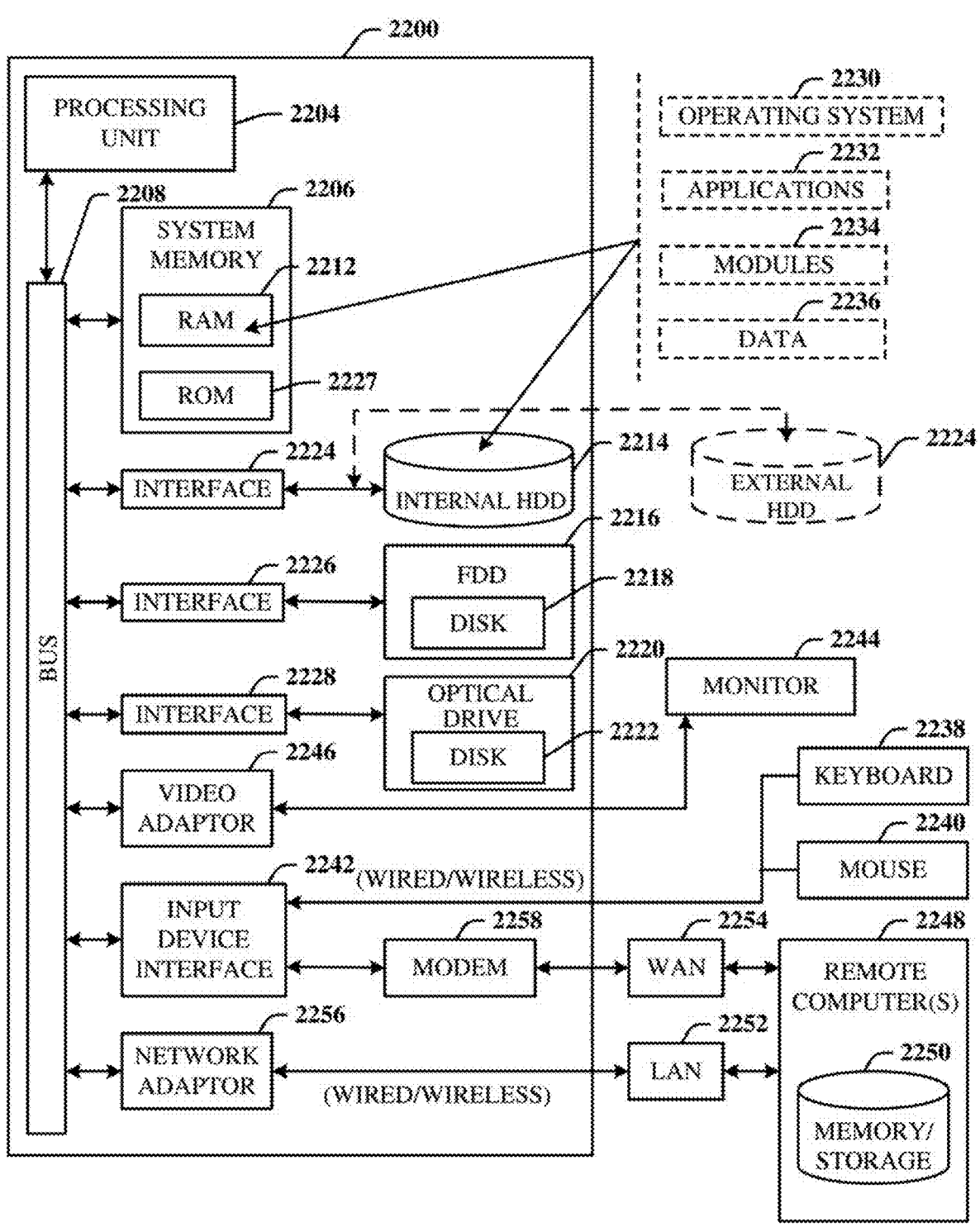
FIG. 22 illustrates an example block diagram of an example computer operable to engage in a system architecture that facilitates wireless communications according to one or more embodiments described herein.

Referring now to FIG. 22, illustrated is an example block diagram of an example computer 2200 operable to engage in a system architecture that facilitates wireless communications according to one or more embodiments described herein. The computer 2200 can provide networking and communication capabilities between a wired or wireless communication network and a server (e.g., Microsoft server) and/or communication device. In order to provide additional context for various aspects thereof, FIG. 22 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 22, implementing various aspects described herein with regards to the end-user device can include a computer 2200, the computer 2200 including a processing unit 2204, a system memory 2206 and a system bus 2208. The system bus 2208 couples system components including, but not limited to, the system memory 2206 to the processing unit 2204. The processing unit 2204 can be any of various commercially available processors. Dual microprocessors and other multi processor architectures can also be employed as the processing unit 2204.

The system bus 2208 can be any of several types of bus structure that can further interconnect to a memory bus (with or without a memory controller), a peripheral bus, and a local bus using any of a variety of commercially available bus architectures. The system memory 2206 includes read-only memory (ROM) 2227 and random access memory (RAM) 2212. A basic input/output system (BIOS) is stored in a non-volatile memory 2227 such as ROM, EPROM, EEPROM, which BIOS contains the basic routines that help to transfer information between elements within the computer 2200, such as during start-up. The RAM 2212 can also include a high-speed RAM such as static RAM for caching data.

The computer 2200 further includes an internal hard disk drive (HDD) 2214 (e.g., EIDE, SATA), which internal hard disk drive 2214 can also be configured for external use in a suitable chassis (not shown), a magnetic floppy disk drive (FDD) 2216, (e.g., to read from or write to a removable diskette 2218) and an optical disk drive 2220, (e.g., reading a CD-ROM disk 2222 or, to read from or write to other high capacity optical media such as the DVD). The hard disk drive 2214, magnetic disk drive 2216 and optical disk drive 2220 can be connected to the system bus 2208 by a hard disk drive interface 2224, a magnetic disk drive interface 2226 and an optical drive interface 2228, respectively. The interface 2224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 2200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. It is to be appreciated that the innovation can be implemented with various commercially available operating systems or combinations of operating systems.

A user can enter commands and information into the computer 2200 through one or more wired/wireless input devices, e.g., a keyboard 2238 and a pointing device, such as a mouse 2240. Other input devices (not shown) can include a microphone, an IR remote control, a joystick, a game pad, a stylus pen, touch screen, or the like. These and other input devices are often connected to the processing unit 2204 through an input device interface 2242 that is coupled to the system bus 2208, but can be connected by other interfaces, such as a parallel port, an IEEE 1394 serial port, a game port, a USB port, an IR interface, etc.

A monitor 2244 or other type of display device is also connected to the system bus 2208 through an interface, such as a video adapter 2246. In addition to the monitor 2244, a computer 2200 typically includes other peripheral output devices (not shown), such as speakers, printers, etc.

The computer 2200 can operate in a networked environment using logical connections by wired and/or wireless communications to one or more remote computers, such as a remote computer(s) 2248. The remote computer(s) 2248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 2250 is illustrated. The logical connections depicted include wired/wireless connectivity to a local area network (LAN) 2252 and/or larger networks, e.g., a wide area network (WAN) 2254. Such LAN and WAN networking environments are commonplace in offices and companies, and facilitate enterprise-wide computer networks, such as intranets, all of which can connect to a global communications network, e.g., the Internet.

When used in a LAN networking environment, the computer 2200 is connected to the local network 2252 through a wired and/or wireless communication network interface or adapter 2256. The adapter 2256 can facilitate wired or wireless communication to the LAN 2252, which can also include a wireless access point disposed thereon for communicating with the wireless adapter 2256.

When used in a WAN networking environment, the computer 2200 can include a modem 2258, or is connected to a communications server on the WAN 2254, or has other means for establishing communications over the WAN 2254, such as by way of the Internet. The modem 2258, which can be internal or external and a wired or wireless device, is connected to the system bus 2208 through the input device interface 2242. In a networked environment, program modules depicted relative to the computer, or portions thereof, can be stored in the remote memory/storage device 2250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not be able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method comprising:
based on first data that describes a first communication packet flow of a user equipment and second data that describes a second communication packet flow of the user equipment, identifying, by a device comprising a processor deployed in a communication network that is distinct from the user equipment, a parameter that is indicative of a behavior of uniform resource locators represented by the first data and the second data, wherein the uniform resource locators correlate to a plurality of different domain name systems, and wherein the behavior indicates a tethering at the user equipment when the behavior indicates overlapping web pages based on the plurality of different domain name systems; and
based on a determination that the tethering is not authorized at the user equipment, disabling, by the device, a tethering capability at the user equipment.

2. The method of claim 1, wherein the identifying comprises using a model trained to detect a group of behaviors comprising the behavior that indicates the tethering at the user equipment.

3. The method of claim 2, further comprising:

prior to the using the model, training, by the device, the model to detect respective fingerprints of first metadata associated with the first communication packet flow and second metadata associated with the second communication packet flow, wherein the training is based on stored fingerprints of previously analyzed metadata associated with previously received communication packet flows.

4. The method of claim 1, further comprising:

prior to the identifying, extracting, by the device, the parameter from the first data and the second data.

5. The method of claim 1, wherein the identifying comprises:

identifying the first data based on first fingerprint data of first metadata associated with the first communication packet flow; and identifying the second data based on second fingerprint data of second metadata associated with the second communication packet flow.

6. The method of claim 5, wherein the first fingerprint data and the second fingerprint data comprise respective domain name system signatures of the plurality of different domain name systems that indicate properties determined to be stable properties.

7. The method of claim 1, wherein the behavior indicated by the parameter is associated with web page displays, and wherein the method further comprises:

determining, by the device, that overlapping web page displays of the overlapping web pages are associated with the user equipment based on an analysis of respective spectroscopic signatures associated with the web page displays.

8. The method of claim 7, wherein the overlapping web page displays comprise a first web page and a second web page, and wherein the respective spectroscopic signatures indicate interactions associated with the overlapping web page displays.

9. A system comprising:

a processor; and a memory that stores executable instructions that, when executed by the processor when deployed in a communication network, facilitate performance of operations, the operations comprising:

based on first data that describes a first communication packet flow of a user equipment and second data that describes a second communication packet flow of the user equipment, identifying a parameter that is indicative of a behavior of uniform resource locators represented by the first data and the second data, wherein the uniform resource locators correlate to a plurality of different domain name systems, and wherein the behavior indicates a tethering at the user equipment associated with the first communication packet flow and the second communication packet flow when the behavior indicates overlapping web pages based on the plurality of different domain name systems, wherein the system is distinct from the user equipment; and based on a determination that the tethering is not authorized at the user equipment, disabling a tethering capability at the user equipment.

10. The system of claim 9, wherein the identifying comprises using a model trained to detect a group of behaviors comprising the behavior that indicates the tethering at the user equipment.

11. The system of claim 10, the operations further comprising:

prior to the using the model, training the model to detect respective fingerprints of first metadata associated with the first communication packet flow and second metadata associated with the second communication packet flow, wherein the training is based on stored fingerprints of previously analyzed metadata associated with previously received communication packet flows.

12. The system of claim 9, the operations further comprising:

prior to the identifying, extracting the parameter from the first data and the second data.

13. The system of claim 9, wherein the identifying comprises:

identifying the first data based on first fingerprint data of first metadata associated with the first communication packet flow; and identifying the second data based on second fingerprint data of second metadata associated with the second communication packet flow.

14. The system of claim 13, wherein the first fingerprint data and the second fingerprint data comprise respective domain name system signatures of the plurality of different domain name systems that indicate properties determined to be stable properties.

15. A non-transitory machine-readable medium, comprising executable instructions that, when executed by a processor when deployed in a communication network, facilitate performance of operations, the operations comprising:

extracting a common parameter from data that describes communication packet flows of a user equipment, wherein the common parameter is associated with uniform resource locators of web page displays and is an indication of concurrent usage via the user equipment, and wherein the uniform resource locators correlate to a plurality of different domain name systems, wherein the processor is distinct from the user equipment;

determining that a tethering is occurring at the user equipment based on a behavior that indicates overlapping web pages based on the plurality of different domain name systems, indicated by the common parameter, wherein the common parameter comprises an indication of overlapping web page displays of the overlapping web pages; and deactivating the tethering at the user equipment based on the determining and based on the tethering being determined not to be authorized for the user equipment.

16. The non-transitory machine-readable medium of claim 15, wherein the overlapping web pages comprise a first web page and a second web page, and wherein respective spectroscopic signatures associated with the web pages indicate interactions associated with the overlapping web pages.

17. The non-transitory machine-readable medium of claim 15, wherein the extracting comprises:

identifying respective metadata associated with communication packet flows of the communication packet flows.

18. The non-transitory machine-readable medium of claim 15, wherein the extracting comprises:

identifying respective fingerprint data of communication packet flows of the communication packet flows.

19. The non-transitory machine-readable medium of claim 18, wherein the respective fingerprint data comprise respective domain name system signatures representative of properties determined to be stable properties.

20. The non-transitory machine-readable medium of claim 15, wherein the communication packet flows are packet flows transmitted via a fifth generation network communication protocol.

* * * * *